(12) United States Patent
Fees et al.

(10) Patent No.: US 10,601,088 B2
(45) Date of Patent: Mar. 24, 2020

(54) BATTERY MODULE ENDPLATE WITH SEALED HOLE FOR COOLING TUBE CONNECTION

(71) Applicant: InEVit LLC, Santa Clara, CA (US)

(72) Inventors: Heiner Fees, Bietigheim-Bissingen (DE); Andreas Track, Sachsenheim (DE); Alexander Eichhorn, Eppingen (DE)

(73) Assignee: TIVENI MERGECO, INC., San Mateo, CA (US)

( * ) Notice: Subject to any disclaimer, the term of this patent is extended or adjusted under 35 U.S.C. 154(b) by 215 days.

(21) Appl. No.: 15/794,504

(22) Filed: Oct. 26, 2017

(65) Prior Publication Data

US 2018/0123198 A1 May 3, 2018

Related U.S. Application Data

(60) Provisional application No. 62/422,101, filed on Nov. 15, 2016, provisional application No. 62/422,116, (Continued)

(51) Int. Cl.
*H01M 10/613* (2014.01)
*H01M 10/625* (2014.01)
(Continued)

(52) U.S. Cl.
CPC ............ *H01M 10/63* (2015.04); *F28F 11/00* (2013.01); *H01M 2/1077* (2013.01);
(Continued)

(58) Field of Classification Search
CPC .. H01M 10/48; H01M 10/613; H01M 10/625; H01M 10/63; H01M 10/647;
(Continued)

(56) References Cited

U.S. PATENT DOCUMENTS

2008/0299446 A1 12/2008 Kelly
2016/0248134 A1* 8/2016 Morse ............... H01M 10/6557

FOREIGN PATENT DOCUMENTS

DE 102009009701 A1 9/2010
DE 102012216916 A1 3/2014

OTHER PUBLICATIONS

International Search Report and Written Opinion dated Jan. 2, 2018 in International Application No. PCT/US2017/058871.

* cited by examiner

*Primary Examiner* — Brittany L Raymond
(74) *Attorney, Agent, or Firm* — Muncy, Geissler, Olds & Lowe, P.C.; Daniel Podhajny

(57) ABSTRACT

An endplate of a battery module is configured with holes through which an inlet and outlet for a cooling tube are arranged. Cooling interfaces between the inlet and outlet and a cooling manifold are arranged outside of a battery module compartment that houses the battery module. In a first embodiment, sealing components separate from the cooling tube are arranged inside the inlet and outlet holes, with each sealing component defining multiple sealing areas (e.g., ring-shaped sealing areas) for sealing a respective hole. In a second embodiment, the cooling tube includes integrated sealing components (e.g., threaded sections of the cooling tube) inside the inlet and outlet holes, with each integrated sealing component defining a single sealing area (e.g., a ring-shaped sealing area) for sealing a respective hole.

11 Claims, 24 Drawing Sheets

Related U.S. Application Data filed on Nov. 15, 2016, provisional application No. 62/414,254, filed on Oct. 28, 2016.

(51) Int. Cl.
*H01M 10/6556* (2014.01)
*H01M 10/6568* (2014.01)
*H01M 10/63* (2014.01)
*H01M 10/6567* (2014.01)
*F28F 11/00* (2006.01)
*H01M 10/653* (2014.01)
*H01M 10/647* (2014.01)
*H01M 10/6557* (2014.01)
*H01M 10/48* (2006.01)
*H01M 2/10* (2006.01)
*H01M 10/6554* (2014.01)

(52) U.S. Cl.
CPC .......... *H01M 2/1094* (2013.01); *H01M 10/48* (2013.01); *H01M 10/613* (2015.04); *H01M 10/625* (2015.04); *H01M 10/647* (2015.04); *H01M 10/653* (2015.04); *H01M 10/6554* (2015.04); *H01M 10/6556* (2015.04); *H01M 10/6557* (2015.04); *H01M 10/6567* (2015.04); *H01M 10/6568* (2015.04); *H01M 2200/20* (2013.01); *H01M 2220/10* (2013.01); *H01M 2220/20* (2013.01)

(58) Field of Classification Search
CPC .......... H01M 10/653; H01M 10/6554; H01M 10/6556; H01M 10/6557; H01M 10/6567; H01M 10/6568; H01M 2/1077; H01M 2/1094; H01M 2200/20; H01M 2220/10; H01M 2220/20; F28F 11/00
See application file for complete search history.

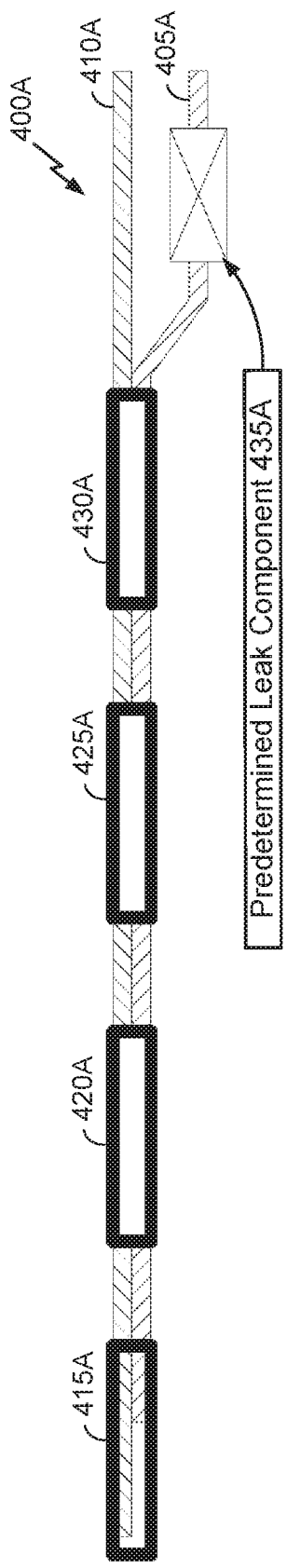
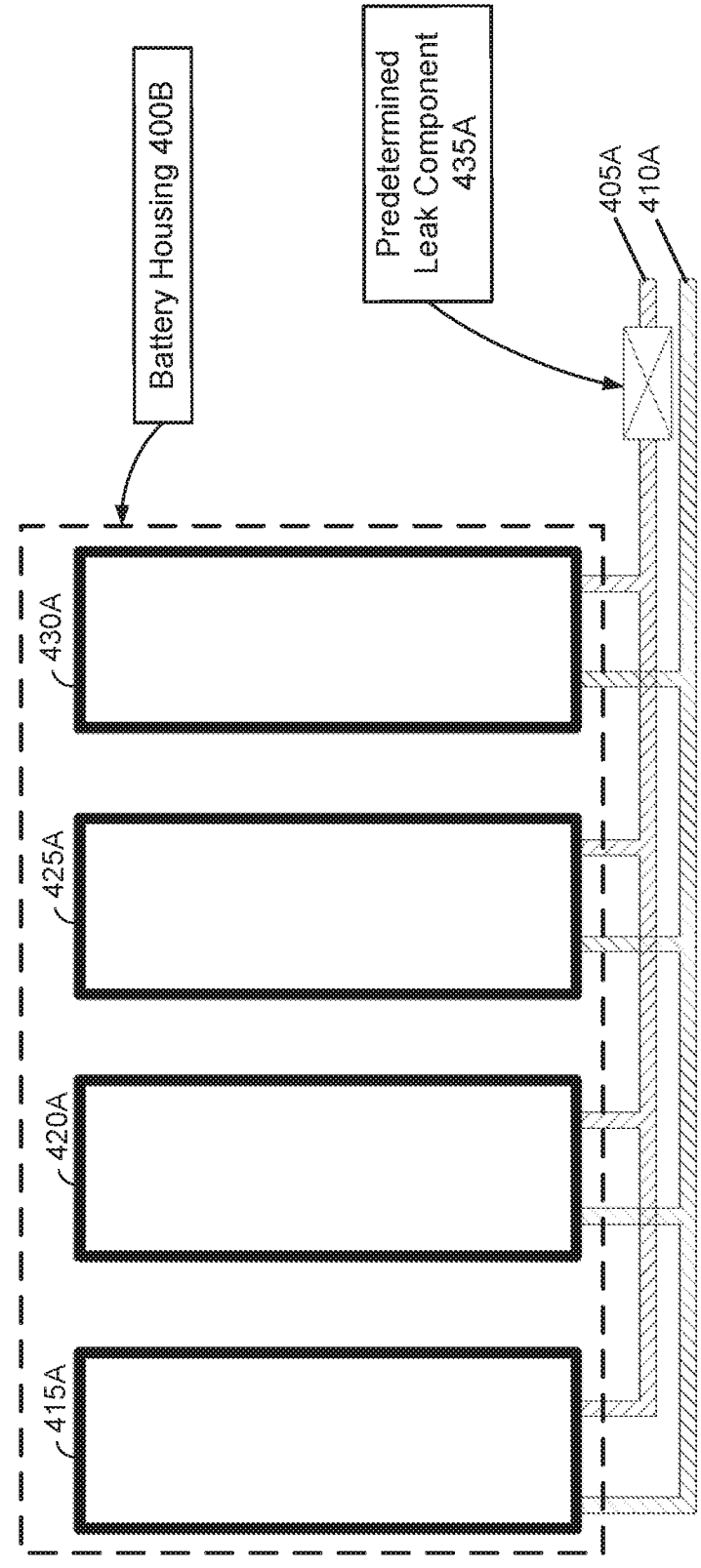

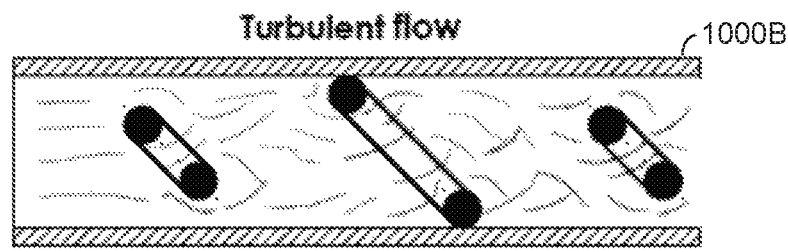
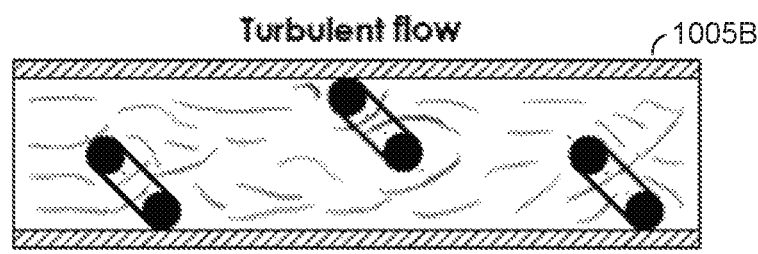
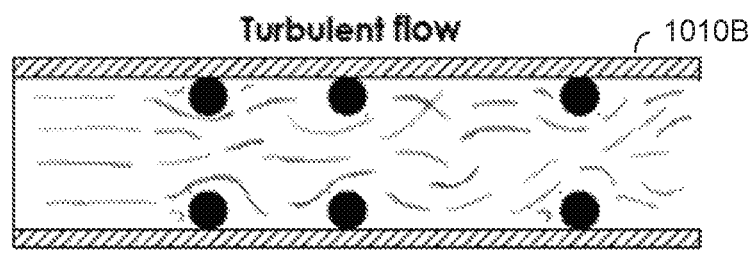
FIG. 10B

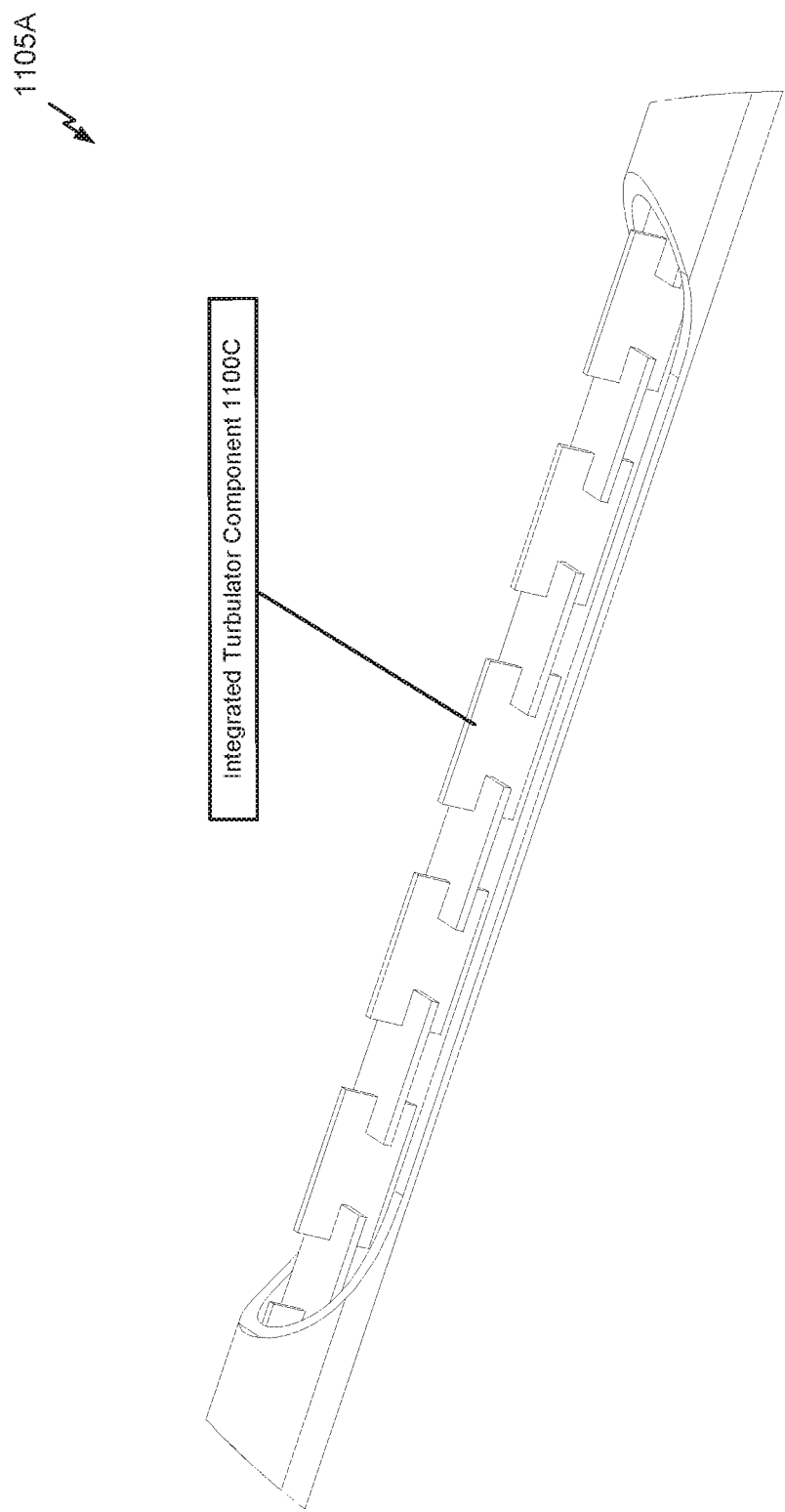

BATTERY MODULE ENDPLATE WITH SEALED HOLE FOR COOLING TUBE CONNECTION

CROSS-REFERENCE TO RELATED APPLICATIONS

The present Application for Patent claims the benefit of U.S. Provisional Application No. 62/414,254, entitled "PREDETERMINED BREAKING POINT AND OTHER COOLING SYSTEM ENHANCEMENTS", filed Oct. 28, 2016, and also to U.S. Provisional Application No. 62/422,101, entitled "INTEGRATED COOLING PLATE ON MODULE AND SEAL ON ENDPLATE WITH CONNECTION JOINT OUTSIDE OF THE BATTERY", filed Nov. 15, 2016, and also to U.S. Provisional Application No. 62/422,116, entitled "TURBULATOR TUBE FOR COOLING SYSTEMS", filed Nov. 15, 2016, each of which is assigned to the assignee hereof and hereby expressly incorporated by reference herein in its entirety.

BACKGROUND

1. Field of the Disclosure

Embodiments relate to battery module endplate with a sealed hole for a cooling tube connection.

2. Description of the Related Art

Energy storage systems may rely upon batteries for storage of electrical power. For example, in certain conventional electric vehicle (EV) designs (e.g., fully electric vehicles, hybrid electric vehicles, etc.), a battery housing mounted into an electric vehicle houses a plurality of battery cells (e.g., which may be individually mounted into the battery housing, or alternatively may be grouped within respective battery modules that each contain a set of battery cells, with the respective battery modules being mounted into the battery housing). The battery modules in the battery housing are connected in series via busbars to a battery junction box (BJB), and the BJB distributes electric power provided from the busbars to an electric motor that drives the electric vehicle, as well as various other electrical components of the electric vehicle (e.g., a radio, a control console, a vehicle Heating, Ventilation and Air Conditioning (HVAC) system, internal lights, external lights such as head lights and brake lights, etc.).

SUMMARY

An embodiment is directed to an endplate arrangement for a battery module configured for insertion into a battery module compartment of an energy storage system, including an endplate configured to secure the battery module inside the energy storage system, a cooling tube including a cooling tube inlet and a cooling tube outlet that extend outside the battery module via first and second holes, respectively, in the endplate, the cooling tube configured to receive liquid coolant via a first cooling interface of a cooling manifold coupled to the cooling tube inlet and to output the liquid coolant via a second cooling interface of the cooling manifold coupled to the cooling tube outlet, and a sealing component arranged inside a given hole among the first and second holes, the sealing component defining a first sealing area between the sealing component and the cooling tube in the given hole and a second sealing area between the sealing component and the endplate in the given hole.

Another embodiment is directed to an endplate arrangement for a battery module configured for insertion into a battery module compartment of an energy storage system, including an endplate configured to secure the battery module inside the energy storage system, and a cooling tube including a cooling tube inlet and a cooling tube outlet that extend outside the battery module via first and second holes, respectively, in the endplate, the cooling tube configured to receive liquid coolant via a first cooling interface of a cooling manifold coupled to the cooling tube inlet and to output the liquid coolant via a second cooling interface of the cooling manifold coupled to the cooling tube outlet, wherein the cooling tube includes an integrated sealing component arranged inside of a given hole among the first and second holes, the integrated sealing component defining a sealing area between the cooling tube and the endplate in the given hole.

BRIEF DESCRIPTION OF THE DRAWINGS

A more complete appreciation of embodiments of the disclosure will be readily obtained as the same becomes better understood by reference to the following detailed description when considered in connection with the accompanying drawings, which are presented solely for illustration and not limitation of the disclosure, and in which:

FIG. 4A illustrates a side-perspective of a cooling manifold arrangement in accordance with an embodiment of the disclosure.

FIG. 4B illustrates a top-perspective of the cooling manifold arrangement in accordance with an embodiment of the disclosure.

FIG. 10B illustrates turbulent flows for cooling tubes with different integrated turbulator component types in accordance with an embodiment of the disclosure.

FIG. 11C illustrates an exposed section from the cooling tube portion of FIG. 11A including an integrated turbulator component in accordance with another embodiment of the disclosure.

DETAILED DESCRIPTION

Embodiments of the disclosure are provided in the following description and related drawings. Alternate embodiments may be devised without departing from the scope of the disclosure. Additionally, well-known elements of the disclosure will not be described in detail or will be omitted so as not to obscure the relevant details of the disclosure.

Energy storage systems may rely upon batteries for storage of electrical power. For example, in certain conventional electric vehicle (EV) designs (e.g., fully electric vehicles, hybrid electric vehicles, etc.), a battery housing mounted into an electric vehicle houses a plurality of battery cells (e.g., which may be individually mounted into the battery housing, or alternatively may be grouped within respective battery modules that each contain a set of battery cells, with the respective battery modules being mounted into the battery housing). The battery modules in the battery housing are connected in series via busbars to a battery junction box (BJB), and the BJB distributes electric power provided from the busbars to an electric motor that drives the electric vehicle, as well as various other electrical components of the electric vehicle (e.g., a radio, a control console, a vehicle Heating, Ventilation and Air Conditioning (HVAC) system, internal lights, external lights such as head lights and brake lights, etc.).

Figure 1:
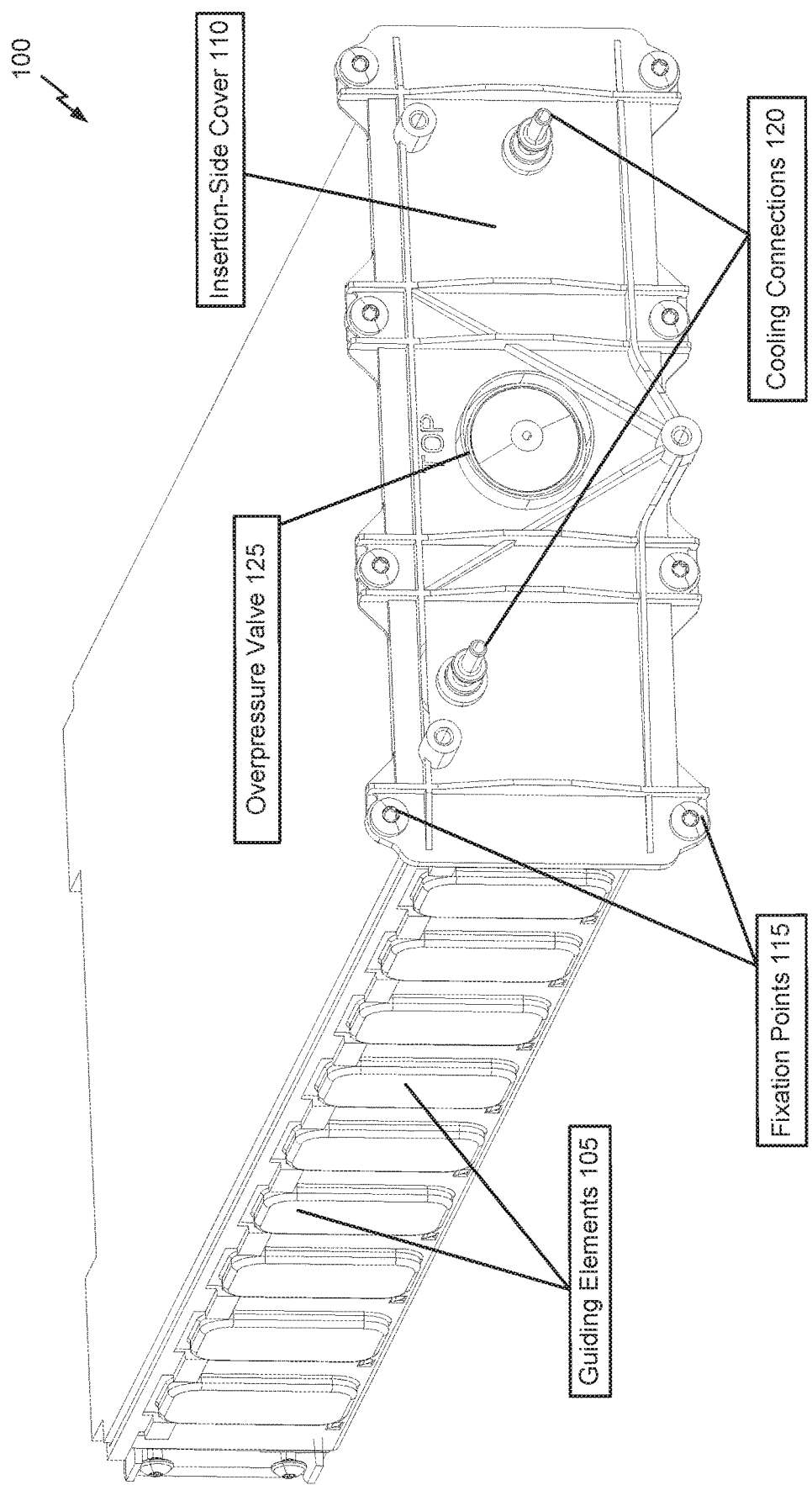
FIG. 1 illustrates a front-perspective of an exterior framing of a battery module in accordance with an embodiment of the disclosure.
Figure 2A:
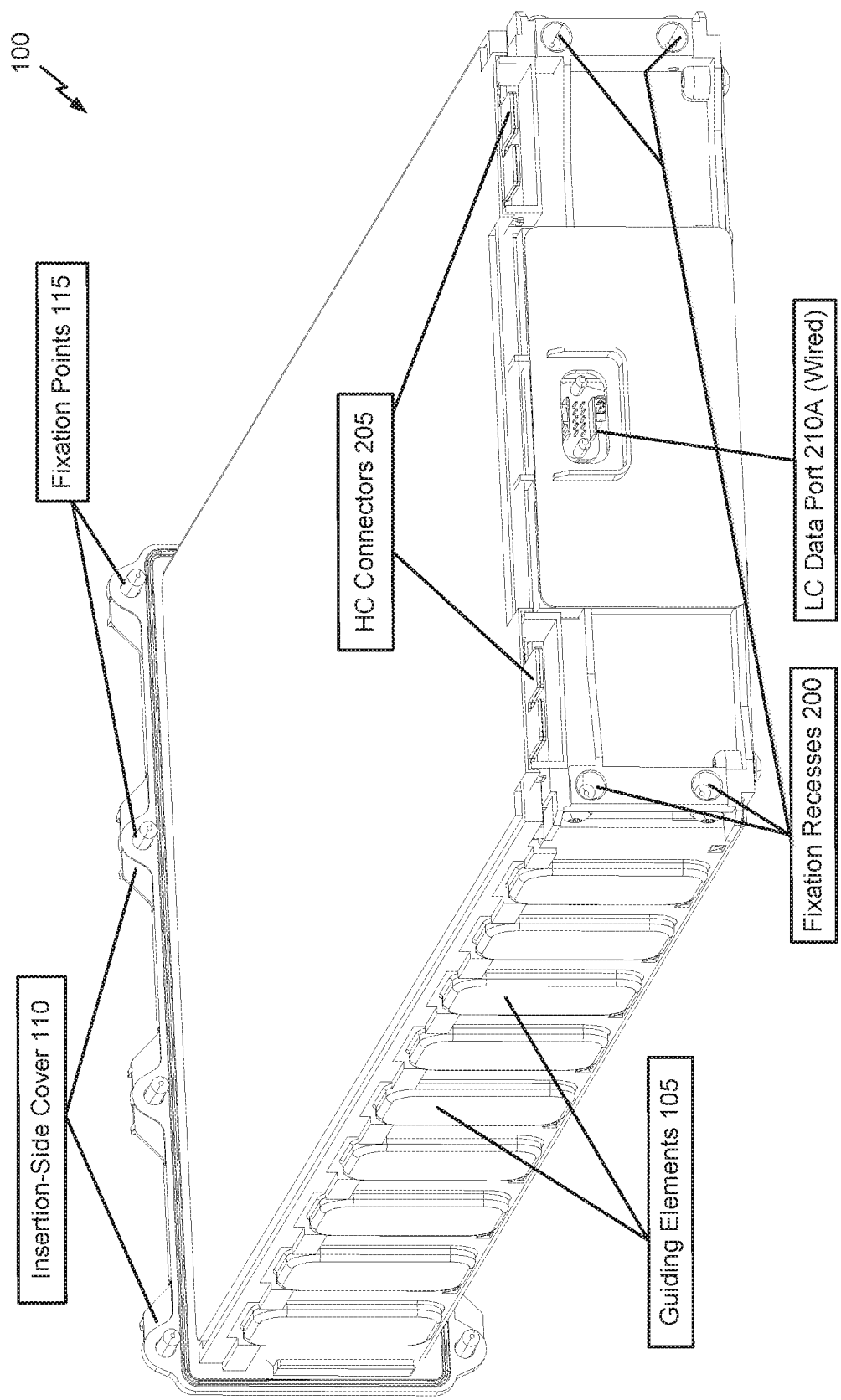
FIGS. 2A-2B illustrates alternative back-perspectives of the exterior framing of the battery module of FIG. 1 in accordance with an embodiment of the disclosure.
Figure 2B:
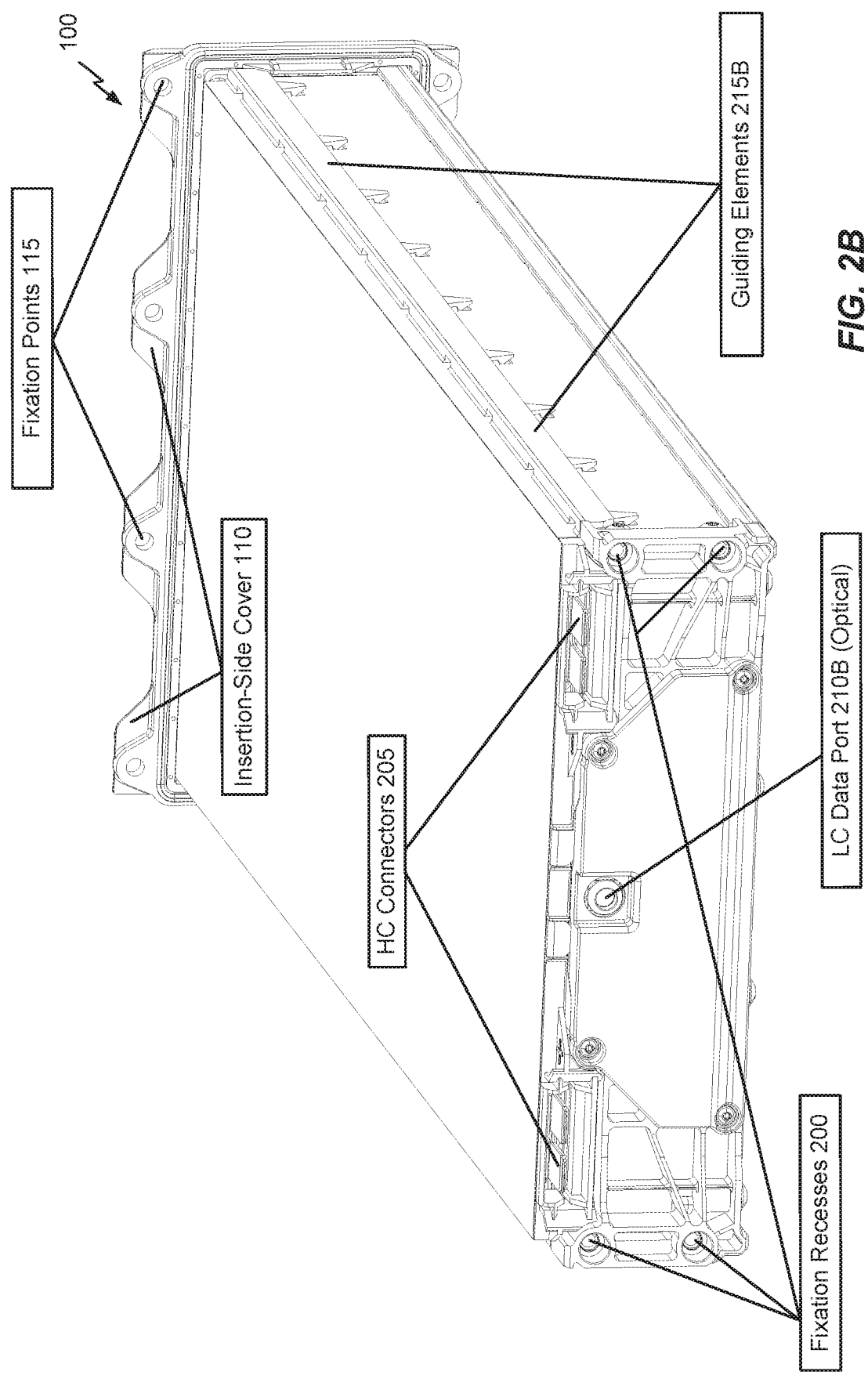

FIG. 1 illustrates a front-perspective of an exterior framing of a battery module 100 in accordance with an embodiment of the disclosure. FIGS. 2A-2B illustrate alternative rear-perspectives of the exterior framing of the battery module 100 in accordance with embodiments of the disclosure. In the examples of FIGS. 1-2B, the battery module 100 is configured for insertion into a battery module compartment. For example, in FIGS. 1-2B, each side of the battery module 100 includes guiding elements 105 or 215B to facilitate insertion into (and/or removal out of) the battery module compartment. In a further example, the guiding elements 105 or 215B are configured to fit into grooves inside the battery module compartment to facilitate insertion and/or removal of the battery module 100. An insertion-side cover 110 (or endplate) is integrated into the battery module 100. Upon insertion, the insertion-side cover 110 may be attached or affixed to the battery module compartment (e.g., via fixation points 115, such as bolt-holes, etc.) to seal the battery module 100 inside the battery module compartment using a cover (or endplate) integrated sealing system (e.g., rubber ring, paper gasket, sealant adhesive, etc.). While the insertion-side cover 110 is depicted in FIGS. 1-2B as integrated into the battery module 100, the insertion-side cover 110 may alternatively be independent (or separate) from the battery module 100, with the battery module 100 first being inserted into the battery module compartment, after which the insertion-side cover 110 is attached.

Referring to FIGS. 1-2B, the insertion-side cover 110 includes fixation points 115 provisioned on a flange, a set of cooling connections 120, and an overpressure valve 125. In an example, the fixation points 115 may be bolt-holes through which bolts may be inserted, and the set of cooling connections 120 may include input and output cooling tube connectors (e.g., through which coolant fluid is pumped into the battery module 100 for cooling one or more cooling plates). The overpressure valve 125 may be configured to open when pressure inside of the battery module 100 exceeds a threshold (e.g., to avoid an explosion or overpressure by degassing in case of a thermal run away of a battery cell in the battery module 100). As will be described in more detail below, the set of cooling connections 120 may include a cooling tube inlet and a cooling tube outlet for a cooling tube that is arranged inside of the battery module 100.

In an alternative embodiment, the fixation points 115 and associated flange can be omitted, and a different fixation mechanism (e.g., a clip or clamping mechanism) can be used to secure the battery module 100 inside a respective battery module compartment.

Referring to FIGS. 2A-2B, the battery module 100 further includes a set of fixation recesses 200 (e.g., to position and secure the battery module 100 in the battery module compartment while inserted), and a set of high current (HC) connectors 205 (e.g., corresponding to positive and negative terminals of the battery module 100, each of which may be connected, via bolting, screwing or plugging, to an electrical interface that is coupled to either the BJB or another battery module). In FIG. 2A, the battery module includes a wired HC data port 210A (e.g., to connect internal sensors of the battery module 100 to the BJB (not shown in FIG. 2A) via a wired LC module-to-tunnel interface (not shown in FIG. 2A) in the battery module compartment). In FIG. 2B, the battery module includes an optical LC data port 210B (e.g., to connect internal sensors of the battery module 100 to the BJB (not shown in FIG. 2B) via an optical LC module-to-tunnel interface (not shown in FIG. 2B) in the battery module compartment, such as a light tube). In an example, the optical LC data port 210B, upon insertion of the battery module 100 into the battery module compartment, may be pressed against the optical LC module-to-tunnel interface (not shown in FIG. 2B) so that optical signals can be exchanged with the BJB through light tube(s) in the tunnel space without collecting dust or other debris. Accordingly, the battery module 100 is configured such that, upon insertion into the battery module compartment, the HC connectors 205 and the LC data port 210A or 210B are each secured and connected (e.g., plugged into, or pressed against and sealed) corresponding connectors in the battery module compartment. As used herein, reference to "LC" and "HC" is generally used to distinguish between data connections (i.e., LC) and power connections (i.e., HC). Generally, power connections are associated with higher currents and/or voltages (e.g., suitable for powering a drive motor of an electric vehicle), while data connections are associated with lower currents and/or voltages (e.g., suitable for transporting data, although low-power loads may also be supported, such as a Universal Serial Bus (USB) charging load).

Embodiments of the disclosure described herein relate to various battery module cooling enhancements. Below, an example battery module housing configuration containing a plurality of battery module compartments for powering an electric vehicle is described, followed by examples of battery module cooling enhancements.

Figure 3A:
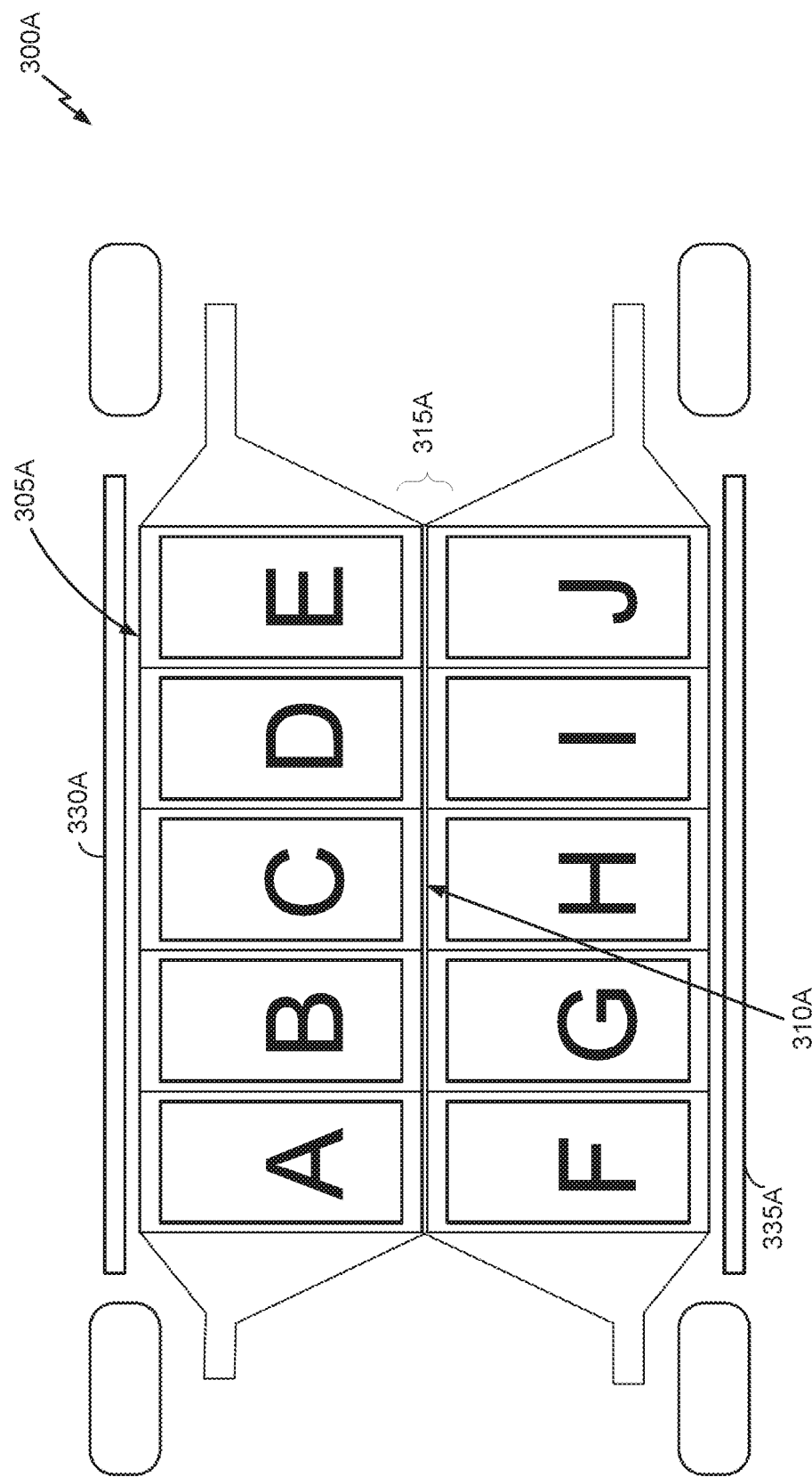
FIG. 3A illustrates a top-perspective of a cross-section of an electric vehicle including a battery housing in accordance with an embodiment of the disclosure.

FIG. 3A illustrates a top-perspective of a cross-section of an electric vehicle 300A including a battery housing 305A in accordance with an embodiment of the disclosure. FIG. 3A depicts various well-known components (e.g., wheels, axles, etc.) of the electric vehicle 300A to provide general context, but these components are not described in detail below for the sake of brevity. With respect to FIG. 3A and other FIGS described below, reference to battery "housing" and battery "module mounting area" is somewhat interchangeable. The battery module mounting area in FIG. 3A (and other FIGS described below) refers to an arrangement of battery module compartments configured to receive insertion of battery modules and to be sealed via insertion-side covers to form a battery housing. Further, in at least one embodiment, the battery module mounting area is part of a floor of the electric vehicle 300A.

Referring to FIG. 3A, the battery housing 305A includes ten battery module compartments denoted as A . . . J, and a middle bar 310A that is positioned between battery module compartments A . . . E and battery module compartments F . . . J on different longitudinal sides of the electric vehicle 300A. Each battery module compartment includes a frame (or plurality of walls) defining an interior space configured to fit a respective battery module, and an insertion-side which may be opened to facilitate insertion and/or removal of the respective battery module. The middle bar 310A may be constructed from the dividers (or firewalls) that separate laterally adjacent (e.g., aligned width-wise as a left/right pairing in the electric vehicle 300A) battery module compartments A . . . J (e.g., the firewall between battery module compartments A and F, the firewall between battery module compartments B and G, etc.).

In an example, the middle bar 310A may be one single longitudinal "bar" that extends across the entirety of the battery housing 305A. In this case, the interior side-walls of each battery module compartment may be attached to the middle bar 310A to form the battery module mounting area. In an alternative example, each laterally adjacent battery module compartment pair may be pre-constructed as a battery module compartment chamber with its own chamber-specific firewall for separating its respective laterally adjacent battery module compartments. The battery module compartment chambers may be stacked longitudinally to form the battery module mounting area. In this case, the middle bar 310A is an aggregation of the individual firewalls contained in each respective battery module compartment chamber across the battery housing 305A.

While the middle bar 310A is illustrated in FIG. 3A as being centered in the battery housing 305A, the middle bar 310A can be positioned in other locations (e.g., closer to one side or the other, so as to fit differently-sized battery modules on left and right sides of the battery module mounting area) in other embodiments. Further, multiple middle bars could be deployed in other implementations. For example, a particularly wide vehicle may be equipped with a battery module mounting area that is wider than the lengths of two battery modules, such that a gap may be present between the two battery modules when inserted into a laterally adjacent pair of battery module compartments. In this case, two separate firewalls may be used for each laterally adjacent battery module compartment so that respective battery modules can comfortably fit therein, with a gap in-between the two firewalls. The two firewalls may form part of two separate "middle" bars (even though each respective firewall may be offset from a center or middle of the battery housing 305A), with the two separate middle bars either corresponding to two long "bars" extending across the battery housing 305A or two aggregations of chamber-specific firewalls from longitudinally stacked battery module compartment chambers. In at least one embodiment, the gap between the two separate middle bars may be used as a tunnel space (e.g., to facilitate optical communication, to run LC/HC busbars, etc.), although the embodiments describe below relate to an implementation where the tunnel space is defined above the battery module compartments, and not in a gap between laterally adjacent battery module compartments.

It will be appreciated that the battery housing 305A including ten battery module compartments A . . . J is shown in FIG. 3A for example purposes only. For example, an electric vehicle with a longer wheel base may be configured with a battery housing having more battery module compartments (e.g., 12, 14, etc.), while an electric vehicle with a shorter wheel base may be configured with a battery housing having fewer battery module compartments (e.g., 8, 6, etc.). The battery module compartments A . . . E are arranged longitudinally (i.e., lengthwise with respect to electric vehicle 300A) on a right-side of the electric vehicle 300A, while battery module compartments F . . . J are arranged longitudinally on a left-side of the electric vehicle 300A.

As used herein, a "battery module" is a package that contains a plurality of battery cells, such as lithium ion battery cells or battery cells made from a different electrode material. Battery modules may be configured with a prismatic or pouch battery cell arrangement (sometimes referred to as a soft pack), while other battery modules are configured with a cylindrical battery cell arrangement.

As used herein, a battery module compartment being "sealed" refers to a seal that is at least water-tight or liquid-tight, and optionally gas-tight (at least, with respect to certain gases such as smoke from fire, carbon, electrolyte particles, dust and debris, etc.). Generally, the sealing of the battery module compartments is a result of its interior walls being welded or glued together (where possible), and any connection interfaces (e.g., insertion-side cover, coolant interface plugs, electrical interface connectors, etc.) being sealed with a suitable type of sealant (e.g., O-ring, rubber gasket, sealing compound, etc.). While the sealing of the battery module compartments could potentially be hermetic (e.g., gas-tight with respect to all gases), hermetic sealing is not necessary (e.g., due to high cost). Accordingly, the sealing of the battery module compartments may be configured to block propagation of likely contaminants (e.g., liquids such as water, flames and/or smoke from fires, carbon, electrolyte particles, dust and debris, etc.) from entering into battery module compartments from an external environment and/or from exiting the battery module compartments towards a protected area (e.g., a passenger cabin of an electric vehicle). Moreover, while various embodiments described below relate to lateral or side-insertion of battery modules into respective battery module compartments, the insertion-side for the battery module compartments A . . . J may vary between different battery module mounting area configurations.

The battery housing 305A described above with respect to FIG. 3A may be based on various battery module mounting area configurations, such as a lateral-inserted battery module mounting area configuration (e.g., battery modules are inserted into a battery module mounting area from the left and right sides of an electric vehicle) which is used to describe various embodiments below. However, while not expressly illustrated, other battery module mounting area configurations are possible, such as vertically-inserted battery module mounting area configurations (e.g., battery modules are inserted into a battery module mounting area from the top or bottom sides of an electric vehicle), hinged-inserted battery module mounting area configurations (e.g., battery module compartments are attached to hinges so that the battery module compartments rotate upwards and downwards via the hinges for battery module insertion), and so on.

Figure 3B:
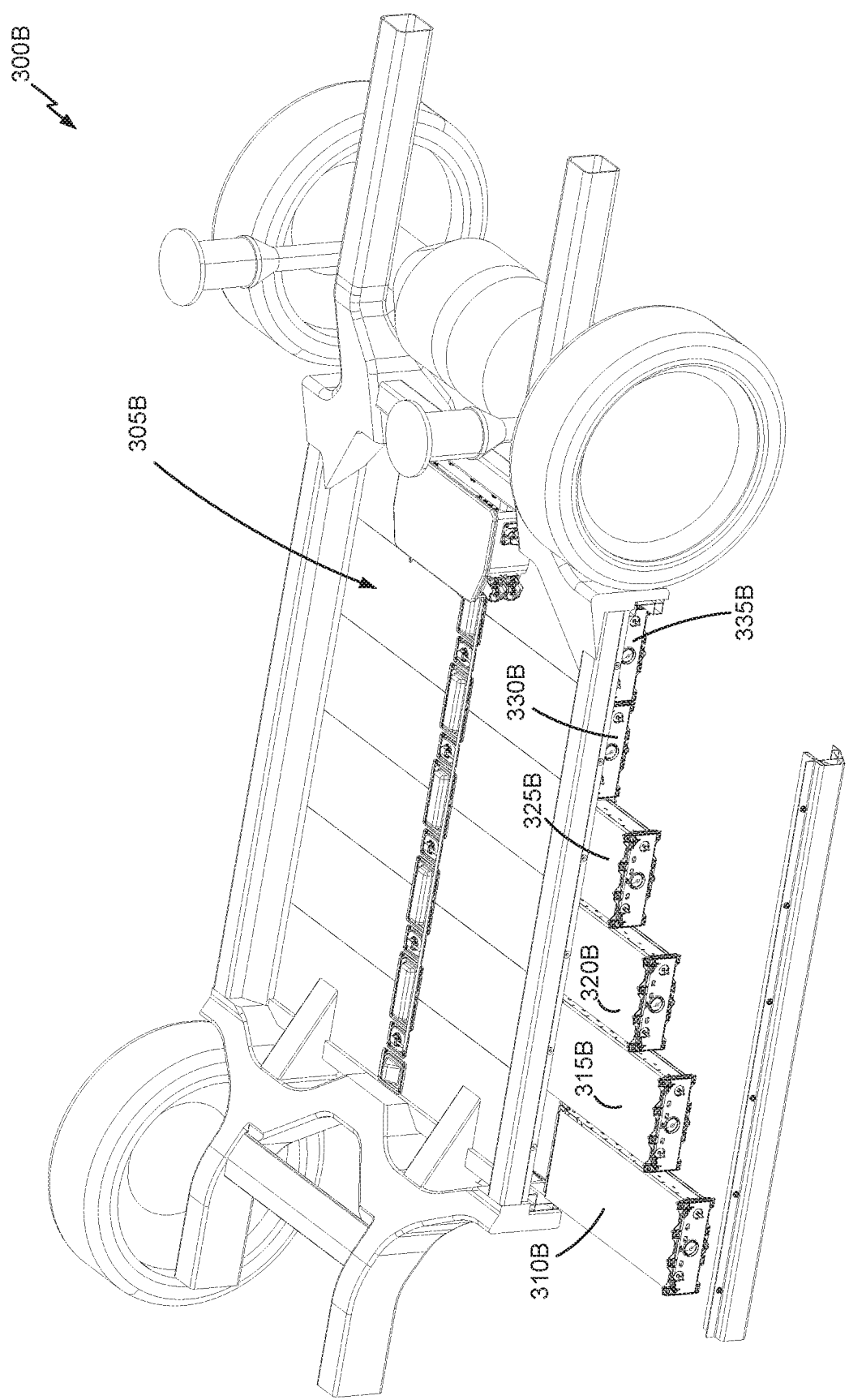
FIG. 3B illustrates an example of an electric vehicle including a battery module mounting area in accordance with an embodiment of the disclosure.

FIG. 3B illustrates an example of an electric vehicle 300B including a battery module mounting area 305B in accordance with an embodiment of the disclosure. Referring to FIG. 3B, the battery module mounting area 305B is configured similarly to the battery housing 305A in FIG. 3A. Various battery modules 310B-335B are depicted at various degrees of insertion into the battery module mounting area 305B. As noted above, upon insertion, fixation recesses on the battery modules 310B-335B may be aligned with corresponding fixation pins on the middle bar 310A, which helps to secure the battery modules 310B-335B inside their respective battery module compartments. Each of the battery modules 310B-335B is further shown as including an insertion-side cover. Once inserted, the insertion-side cover may be secured to the battery module mounting area 305B (e.g., by screwing or bolting), which helps to maintain each battery module's fixation pins inside each respective battery module's fixation recesses during operation of the electric vehicle 300A.

Figure 3C:
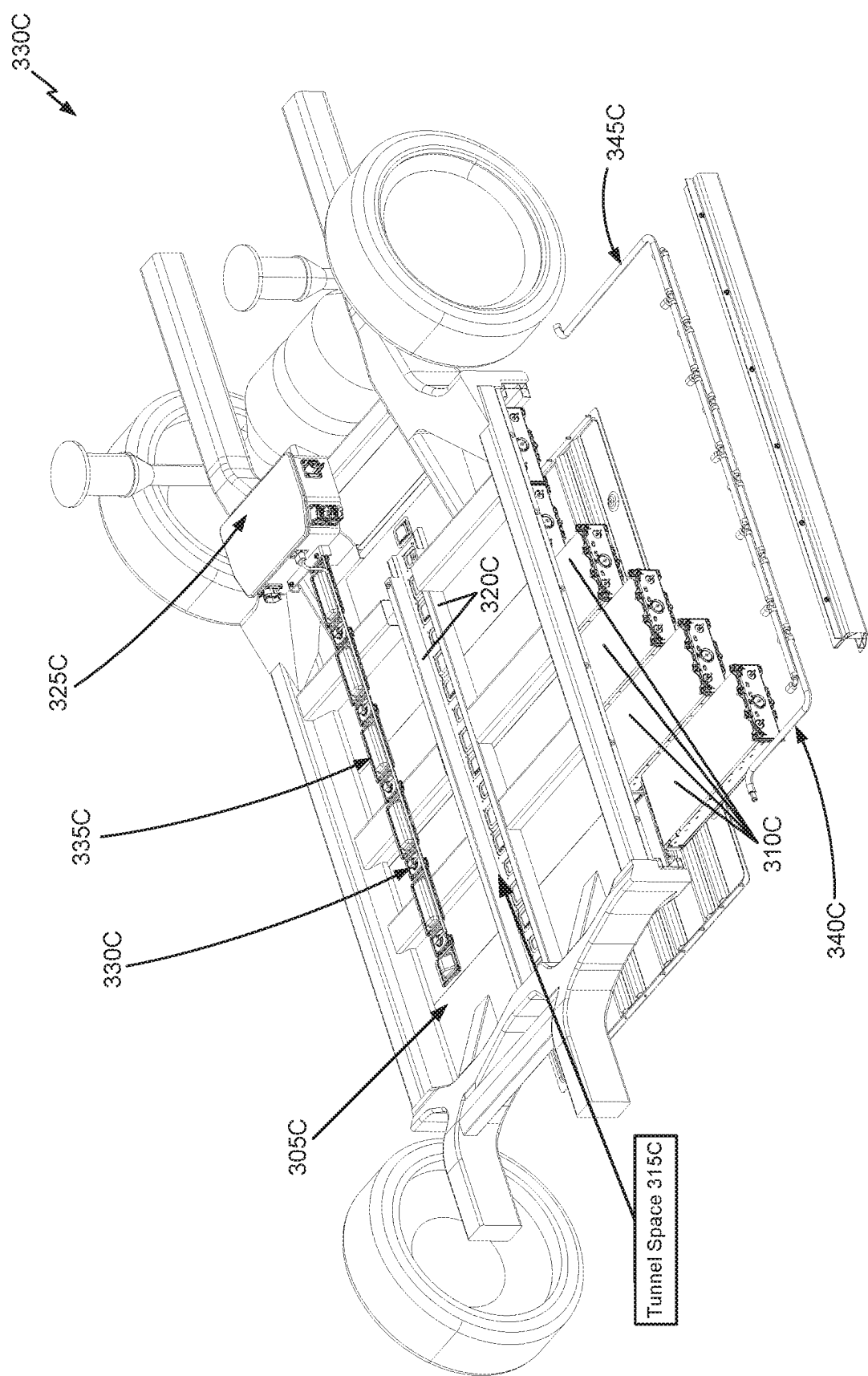
FIG. 3C illustrates an example of an electric vehicle including a battery module mounting area in accordance with another embodiment of the disclosure.

FIG. 3C illustrates an example of an electric vehicle 300C including a battery module mounting area 305C in accordance with another embodiment of the disclosure.

Referring to FIG. 3C, the battery module mounting area 305C is configured similarly to the battery module mounting area 305B in FIG. 3B. Various battery modules 310C are shown at various degrees of insertion into the battery module mounting area 305C. A tunnel space 315C is defined above the battery module mounting area 305C by a set of center-mounted bars 320C. Further shown in FIG. 3C is a BJB 325C that is configured to be connected to the various battery modules via both LC busbars 330C and module-to-module power connectors 335C. While not shown expressly in the exploded view depicted in FIG. 3C, the LC busbars 330C and module-to-module power connectors 335C may be installed inside of the tunnel space 315C, and then sealed (e.g., via bolting or screwing onto the top of the battery module mounting area 305C). Also, while the BJB 325C, the LC busbars 330C and the module-to-module power connectors 335C are shown as floating above the battery housing components in FIG. 3C, it will be appreciated that this is for convenience of illustration as the BJB 325C is installed adjacent to the tunnel space 315C, and the LC busbars 330C and the module-to-module power connectors 335C are installed inside the tunnel space 315C.

Further shown in FIG. 3C are cooling manifold sections 340C and 345C (e.g., made from aluminum, copper, etc.), which form part of a cooling manifold that is configured to carry liquid coolant to and from cooling tubes arranged inside the plurality of battery modules. The cooling manifold sections 340C and 345C are described in more detail with respect to FIG. 3D.

Figure 3D:
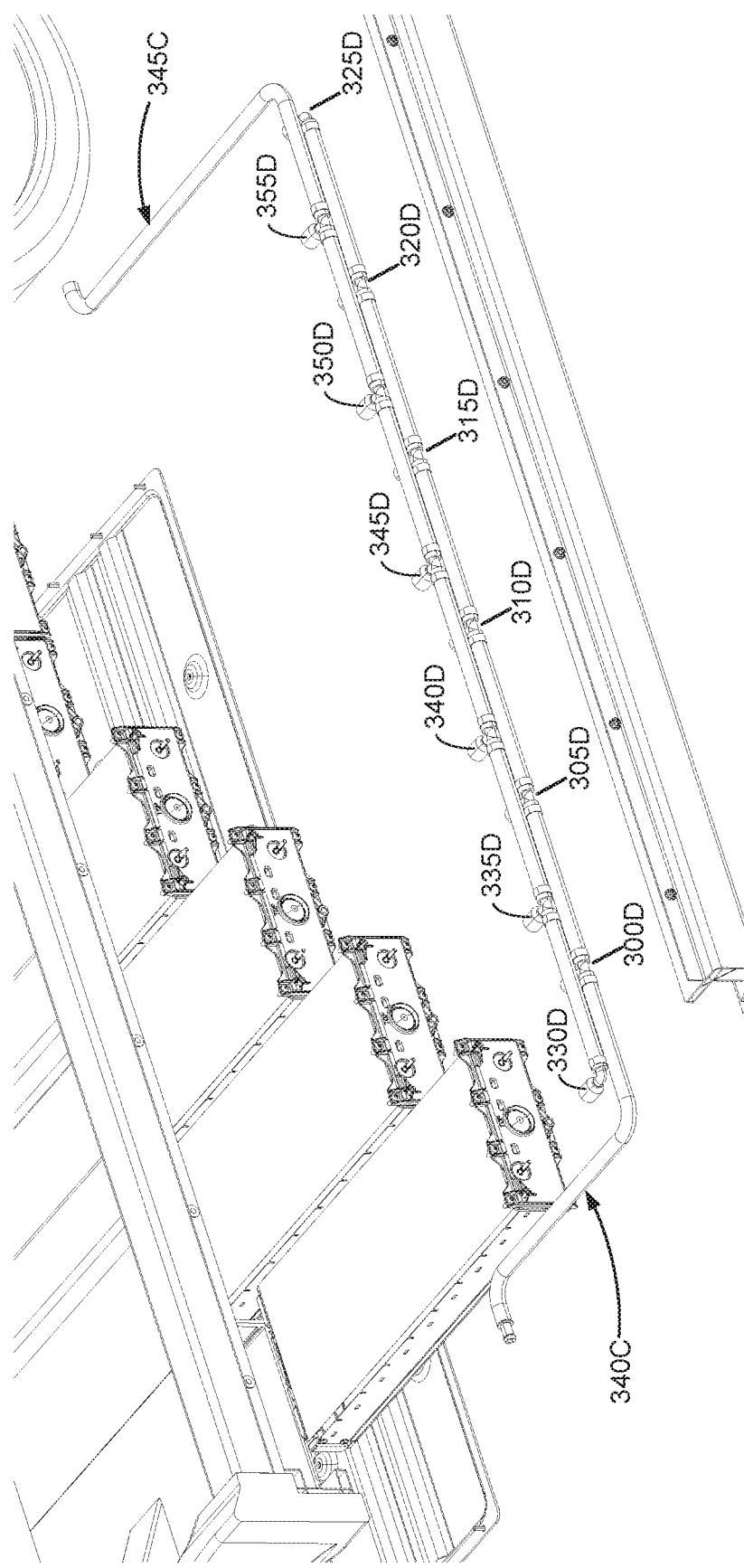
FIG. 3D illustrates cooling manifold sections in accordance with another embodiment of the disclosure.

Referring to FIG. 3D, the cooling manifold section 340C includes cooling interfaces 300D-325D that are configured to be coupled to respective cooling tube inlets on the battery modules 310C. The cooling manifold section 345C includes cooling interfaces 330D-355D that are configured to be coupled to respective cooling tube outlets on the battery modules 310C. So, liquid coolant flows from the cooling manifold section 340C through the cooling interfaces 300D-325D into cooling tubes (not shown) inside the battery modules 310C via respective cooling tube inlets, and the liquid coolant flows from the cooling tubes (not shown) out to the cooling manifold section 340C through the cooling interfaces 330D-355D via respective cooling tube outlets. In an example, the cooling tube inlets and outlets correspond to the cooling connections 120 shown in FIG. 1, with a lower of the two cooling connections 120 being the cooling tube inlet, and a higher of the two cooling connections 120 being the cooling tube outlet. However, it will be appreciated that the inlet/outlet configuration could be different in other embodiments (e.g., the cooling tube outlet could be arranged lower or at a same height as the cooling tube inlet, etc.). The cooling tube inlets and outlets may each be configured with a fitting to facilitate coupling to a respective cooling interface on the cooling manifold. While not shown in FIGS. 3C-3D, the cooling manifold section 340C may carry cold liquid coolant from a cooling system, while the cooling manifold section 345C cycles warmer liquid coolant back to the cooling system. Also, while not shown expressly in FIGS. 3C-3D, similar cooling manifold sections may also be arranged on the other side of the electric vehicle 300B for providing the liquid coolant to other battery modules. As used herein, the terminology of "cooling manifold" may reference the overall manifold structure for the cooling system (e.g., for cycling liquid coolant to/from the battery modules), or alternatively to particular cooling manifold sections, such as cooling manifold sections 340C-345C.

Referring to FIG. 3D, it will be appreciated that each of the cooling interfaces 300D-355D is configured to connect to a corresponding fitting for a cooling tube inlet or outlet outside of the battery housing where the battery modules are stored in respective battery module compartments. Accordingly, any breach or rupture at the point where the cooling interfaces 300D-355D are coupled to the cooling tube inlets and outlets will not cause flooding inside of the battery module compartments. In particular, one or more of the connections between the cooling interfaces 300D-355D and the cooling tube inlets and outlets may be damaged during a crash, thereby causing a leak. However, by arranging these connections outside of the battery module compartments, any such leaks will flood outside of the battery module compartments such that the battery module compartments are not flooded.

FIG. 4A illustrates a side-perspective of a cooling manifold arrangement 400A in accordance with an embodiment of the disclosure. Referring to FIG. 4A, cooling manifold arrangement 400A includes a first cooling manifold section 405A and a second cooling manifold section 410A. Similar to the cooling manifold section 340C in FIGS. 3C-3D, the cooling manifold section 405A includes cooling interfaces (not shown) that are configured to be coupled to respective cooling tube inlets (not shown) on the battery modules 415A-430A. Also, similar to the cooling manifold section 345C in FIGS. 3C-3D, the cooling manifold section 410A includes cooling interfaces (not shown) that are configured to be coupled to respective cooling tube outlets (not shown) on the battery modules 415A-430A. So, liquid coolant flows from the cooling manifold section 405A through the cooling interfaces into cooling tubes (not shown) of the battery modules 415A-430A via respective cooling tube inlets, and the liquid coolant flows from the cooling tubes (not shown)

out to the cooling manifold section 410A through the cooling interfaces via respective cooling tube outlets.

Further depicted in FIG. 4A is a predetermined leak component 435A that is arranged at a defined section of the cooling manifold that is outside of an associated battery housing. The predetermined leak component 435A configured to cause the liquid coolant to leak out of the defined section of the cooling manifold in response to crash forces (e.g., either by the raw impact of the crash forces or via a control signal that is sent to the predetermined leak component 435A in response to detection of the crash forces, such as an airbag signal). As shown in FIG. 4A, in one example, the defined section is arranged at a lowest point of the cooling manifold (e.g., so that any liquid coolant leaks do not flow towards the battery modules 415A-430A), with the predetermined leak component 435A being integrated into the cooling manifold section 405A carrying liquid coolant from the cooling system to the battery modules 415A-430A. In a further example, the defined section of the cooling manifold where the predetermined leak component 435A is arranged may be specifically configured to be on an inlet-side of the battery modules within the cooling manifold section 405A. So, when the predetermined leak component 435A ruptures, explodes or opens in response to crash forces, additional liquid coolant is blocked from entry into the battery module compartments through their respective cooling tube inlets.

FIG. 4B illustrates a top-perspective of the cooling manifold arrangement 400A in accordance with an embodiment of the disclosure.

Referring to FIG. 4A, a battery housing 400B is shown, with the battery modules 415A-430A being positioned inside the battery housing 400B, with the cooling manifold sections 405A-410A and the predetermined leak component 435A being arranged outside of the battery housing 400B. So, any leakage from the predetermined leak component 435A will not contaminate the battery modules 415A-430A due to the protection (e.g., liquid-tight seal) of respective battery module components that secure the battery modules 415A-430A inside of the battery housing 400B.

The predetermined leak component 435A may be configured in a variety of ways, as will be explained in the following examples.

In a first example, the predetermined leak component 435A may correspond to a cooling manifold section that is structurally weaker than one or more other sections of the cooling manifold and is configured to break before the one or more other sections in response to the crash forces (i.e., directly in response to the raw impact of the crash forces). For example, the predetermined leak component 435A may be made from plastic or thinner metal relative to the other sections of the cooling manifold section 405A.

In a second example, the predetermined leak component 435A may correspond to an explosive mechanism that is configured to explode in response to the crash forces. For example, the explosive mechanism may be configured to explode in response to a control signal from a controller (e.g., at the BJB or other control entity) that is sent by the controller to the explosive mechanism in response to the crash forces. In an example, the control signal to cause the explosive mechanism to explode may be triggered in conjunction with an airbag signal that causes driver and passenger side airbags to deploy.

In a third example, the predetermined leak component 435A may correspond to a valve (e.g., an electrical valve or a magnetically controlled valve) that is configured to open in response to the crash forces. For example, the valve may be configured to open in response to a control signal from a controller (e.g., at the BJB or other control entity) that is sent by the controller to the valve in response to the crash forces. In a further example, the valve may be controlled (e.g., opened/closed) electrically, magnetically (e.g., controlled via an electric magnet), or any combination thereof. In an example, the control signal to cause the valve to open may be triggered in conjunction with an airbag signal that causes driver and passenger side airbags to deploy.

Referring to FIGS. 4A-4B, the leaking of the predetermined leak component 435A which is triggered by crash forces may reduce the amount of liquid coolant that leaks inside the individual battery module compartments. However, it is possible that the battery modules inside the battery module compartments will rupture, causing some amount of liquid coolant inside respective cooling tubes of the battery modules to leak inside the battery module compartments.

Figure 5:
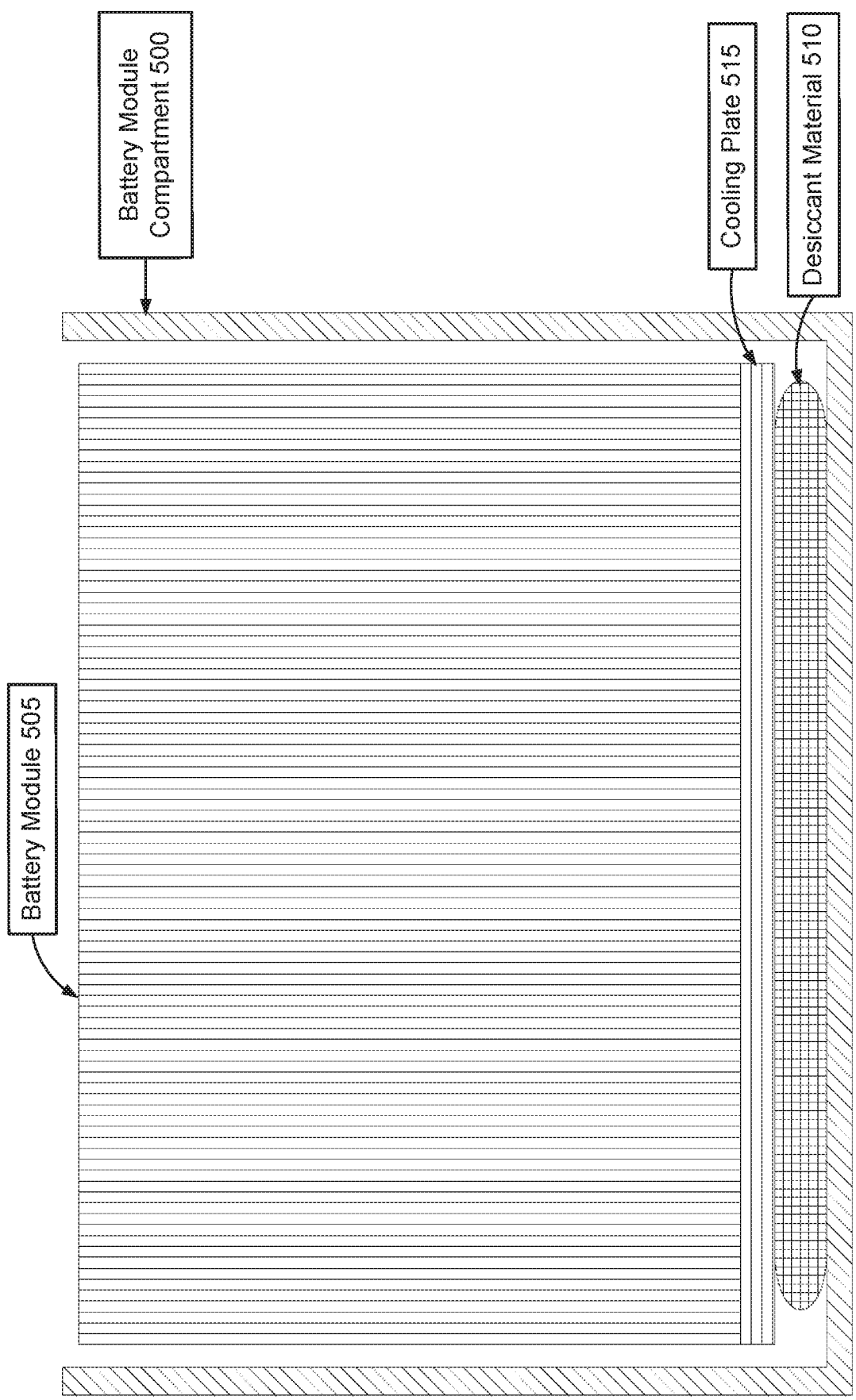
FIG. 5 illustrates a battery module compartment including a desiccant material in accordance with an embodiment of the disclosure.

As shown in FIG. 5, a battery module compartment 500 of a battery housing includes a battery module 505 may include a desiccant material 510. In an example, the desiccant material 510 may be arranged at a bottom of the battery module compartment 500 underneath a cooling plate 515 of the battery module 505. The desiccant material 510 will absorb or soak up a certain amount of liquid coolant that leaks inside the battery module compartment 500. In an example, the desiccant material may be deployed as a powder that is packed in a perforated bag. The bag may be positioned inside the battery module 505 itself, or alternatively outside of the battery module 505 on a floor (or bottom) of the battery module compartment 500.

The desiccant material 510 may be used in conjunction with any other leakage reduction embodiments described in the present disclosure, including but not limited to the cooling manifold arrangement 400A of FIG. 4A. For example, if less than all of the liquid coolant leaks out of the defined section of the cooling manifold in response to the crash forces based on operation of the predetermined leak component 435A, the desiccant material arranged inside of one or more battery module compartments may then absorb some or all of any residual liquid coolant that leaks inside of the battery module compartments. Further, the desiccant material 510 may also help to absorb liquid coolant that leaks in associated with non-crash scenarios, such as leaks that occur within the battery modules as described below with respect to FIG. 6.

Figure 6:
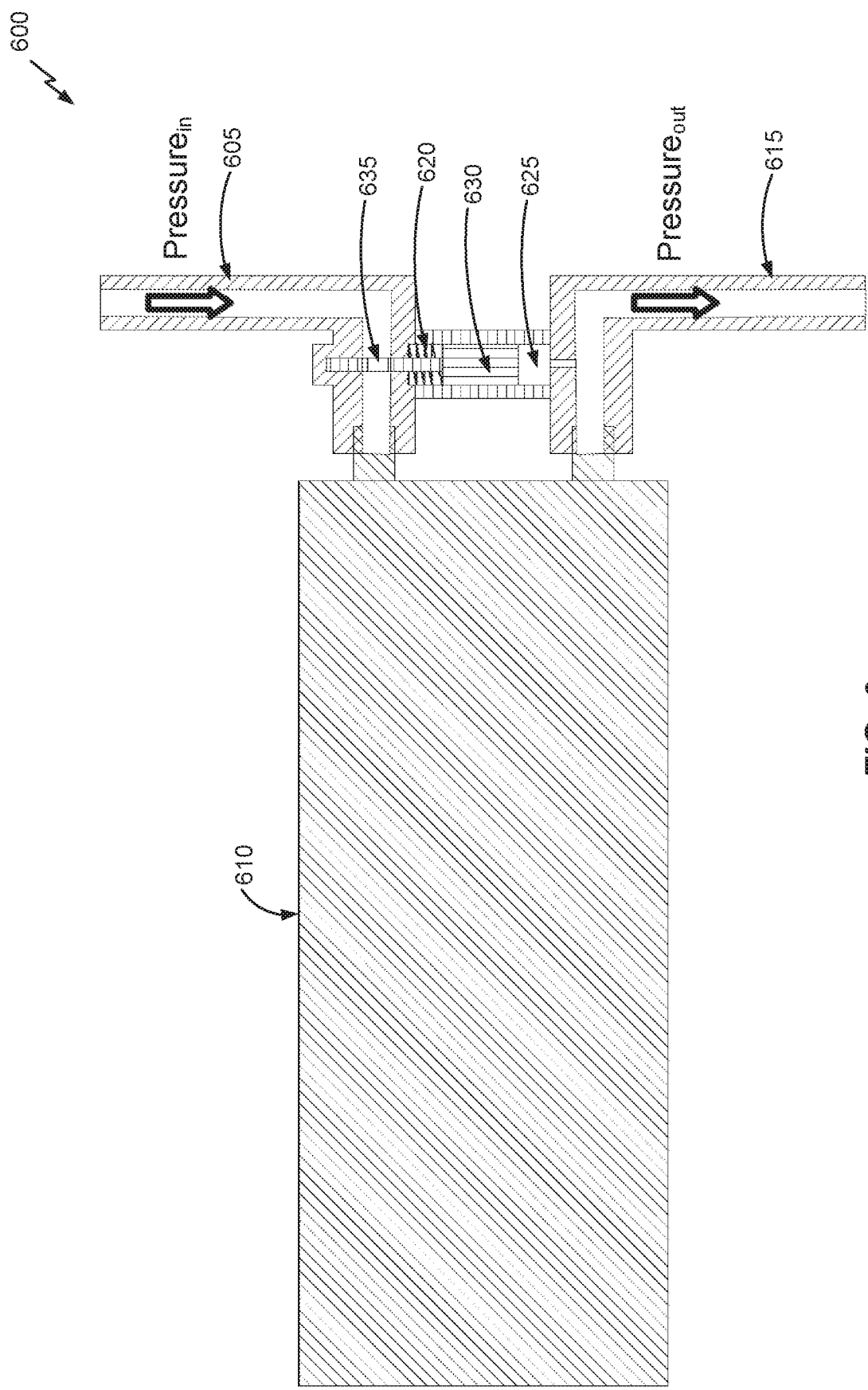
FIG. 6 illustrates a control arrangement configured to control cooling of a battery module in accordance with an embodiment of the disclosure.

FIG. 6 illustrates a control arrangement 600 configured to control cooling of a battery module in accordance with an embodiment of the disclosure. Referring to FIG. 6, the control arrangement includes a cooling manifold section 605 carrying liquid coolant to a cooling plate 610 via a cooling tube inlet of a battery module, and a cooling manifold section 615 receiving the liquid coolant via a cooling tube outlet and carrying the liquid coolant away from the battery module.

Referring to FIG. 6, a control mechanism is arranged between an inlet side and an outlet side of the cooling tube for the battery module. The control mechanism includes a first pressure sensor 620 configured to measure a first liquid pressure of the liquid coolant in the coolant manifold section 605 on an inlet side of the cooling tube of the battery module, a first pressure sensor 625 configured to measure a second liquid pressure of the liquid coolant in the coolant manifold section 615 on an outlet side of the cooling tube of the battery module, a controller 630 configured to determine whether a differential between the first and second liquid pressures exceeds a threshold, and a valve configured to selectively shut off a flow of the liquid coolant through the cooling tube based at least in part on whether the determined differential between the first and second liquid pressures exceeds the threshold.

It will be appreciated that some drop in pressure between the inlet side and outlet side of the cooling tube of the battery module is generally expected during normal operation when no leak is present inside the battery module. However, this drop in pressure across the inlet and outlet sides of the cooling tube is increased when there is a leak in the cooling tube. So, the threshold evaluated by the controller 630 may be configured to be high enough so that a leak in the cooling tube is indicated when the differential between the first and second liquid pressures exceeds the threshold. In other words, the threshold is greater than an amount of pressure loss through the cooling tube that occurs when no leak is present in the cooling tube.

Referring to FIG. 6, in an example, the valve 635 is an electrical valve, and the controller 630 directs the automatic valve to shut off (i.e., close) in response to a determination that the differential between the first and second liquid pressures exceeds the threshold. In an alternative example, the valve is a mechanical valve. In a further example, the mechanical or electrical valve 635 may be configured to automatically close in response to a determination that the differential between the first and second liquid pressures exceeds the threshold. In an alternative example, instead of automatically closing the valve 635, the controller 630 sends an alert to a user (e.g., to the user's phone, to a vehicle dashboard which flashes a warning light, etc.) in response to a determination that the differential between the first and second liquid pressures exceeds the threshold. The alert prompts the user to bring the electric vehicle in for service and/or to shut off (i.e., close) the manual valve. In FIG. 6, the valve 635 is arranged on the inlet side of the cooling tube of the battery module. However, in other embodiments, the valve 635 may alternatively be arranged on the outlet side of the cooling tube of the battery module.

While FIGS. 4A-6 generally relate to mechanisms for controlling liquid coolant leaks, other embodiments are directed to ensuring that the cooling tube is sealed at both the inlet side and outlet side of the cooling tube.

Figure 7A:
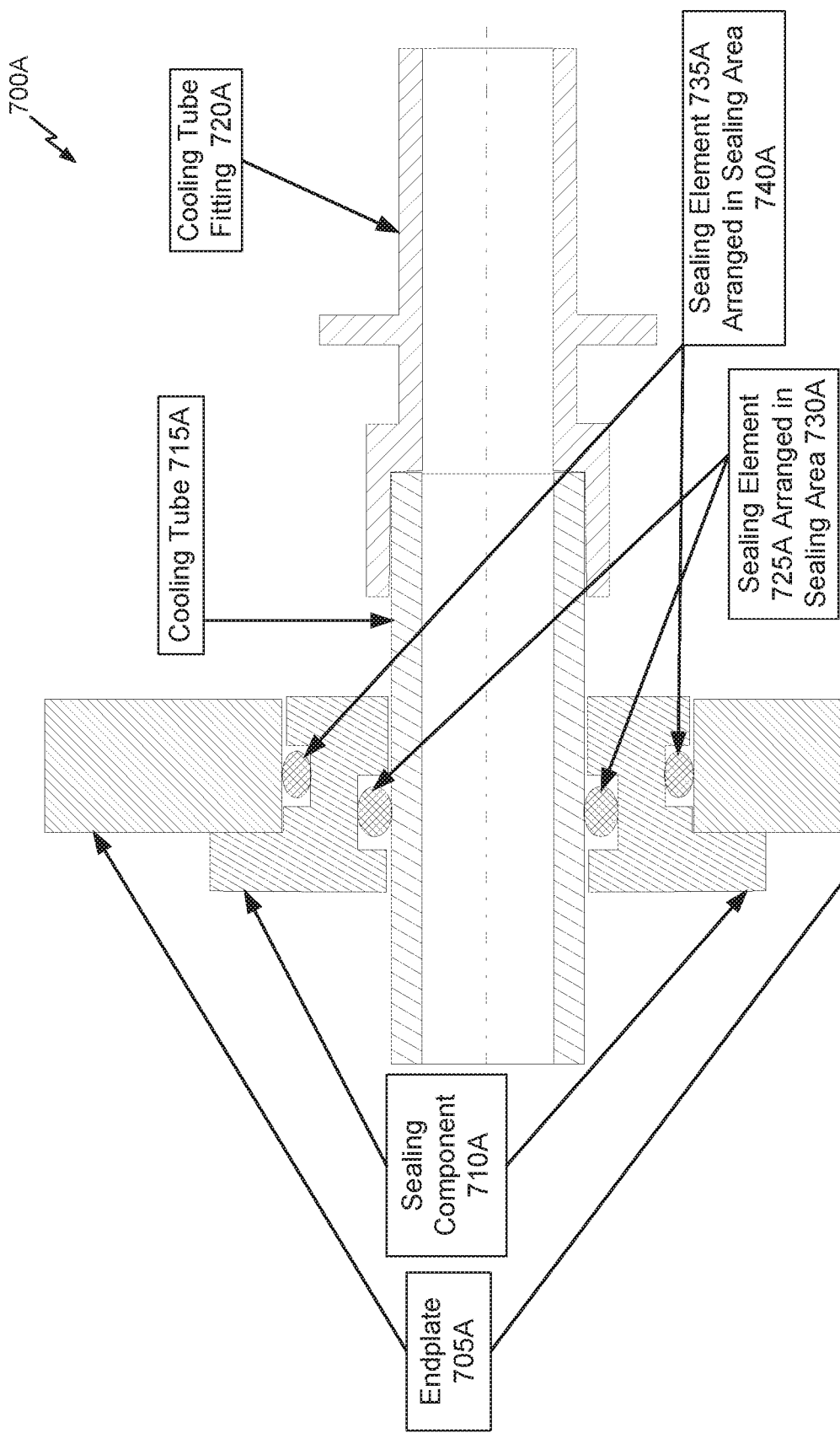
FIG. 7A illustrates an endplate arrangement in accordance with an embodiment of the disclosure.

FIG. 7A illustrates an endplate arrangement 700A in accordance with an embodiment of the disclosure. In an example, the endplate arrangement 700A may correspond to a side perspective of a portion of the insertion-side cover 110 of FIG. 1 which depicts the area surrounding either of cooling connections 120.

Referring to FIG. 7A, sealing component 710A is arranged inside of a hole in an endplate 705A. The sealing component 710A includes its own hole, through which a cooling tube 715A is threaded. While not shown in FIG. 7A, another end of the cooling tube 715A may be threaded through another sealing component on the endplate 705A. So, the cooling tube section depicted in FIG. 7A may correspond to either a cooling tube inlet or a cooling tube outlet of the cooling tube 715A. A cooling tube fitting 720A is attached to the cooling tube 715A for coupling to a corresponding cooling interface of the cooling manifold (not shown in FIG. 7A).

In the embodiment of FIG. 7A, two sealing elements are used to ensure that the sealing component 710A seals the hole in the endplate 705A. A sealing element 725A is arranged in sealing area 730A between the sealing component 710A and the endplate 705A, and a sealing element 735A is arranged in sealing area 740A between the sealing component 710A and the cooling tube 710A. The sealing areas 735A and 740A are arranged as ring-shaped gaps, and the sealing elements 725A and 735A are configured as rings. In an example, the sealing elements 725A and 735A may be formed from vulcanized rubber. Accordingly, both sides of the sealing component 710A are sealed (e.g., liquid-tight).

As noted above, the endplate arrangement 700A may be configured for either a cooling tube inlet or a cooling tube outlet of the cooling tube 710A. A similar endplate arrangement may be deployed for the other side of the cooling tube 710A, such that both cooling tube inlet and the cooling tube outlet are sealed.

Figure 7B:
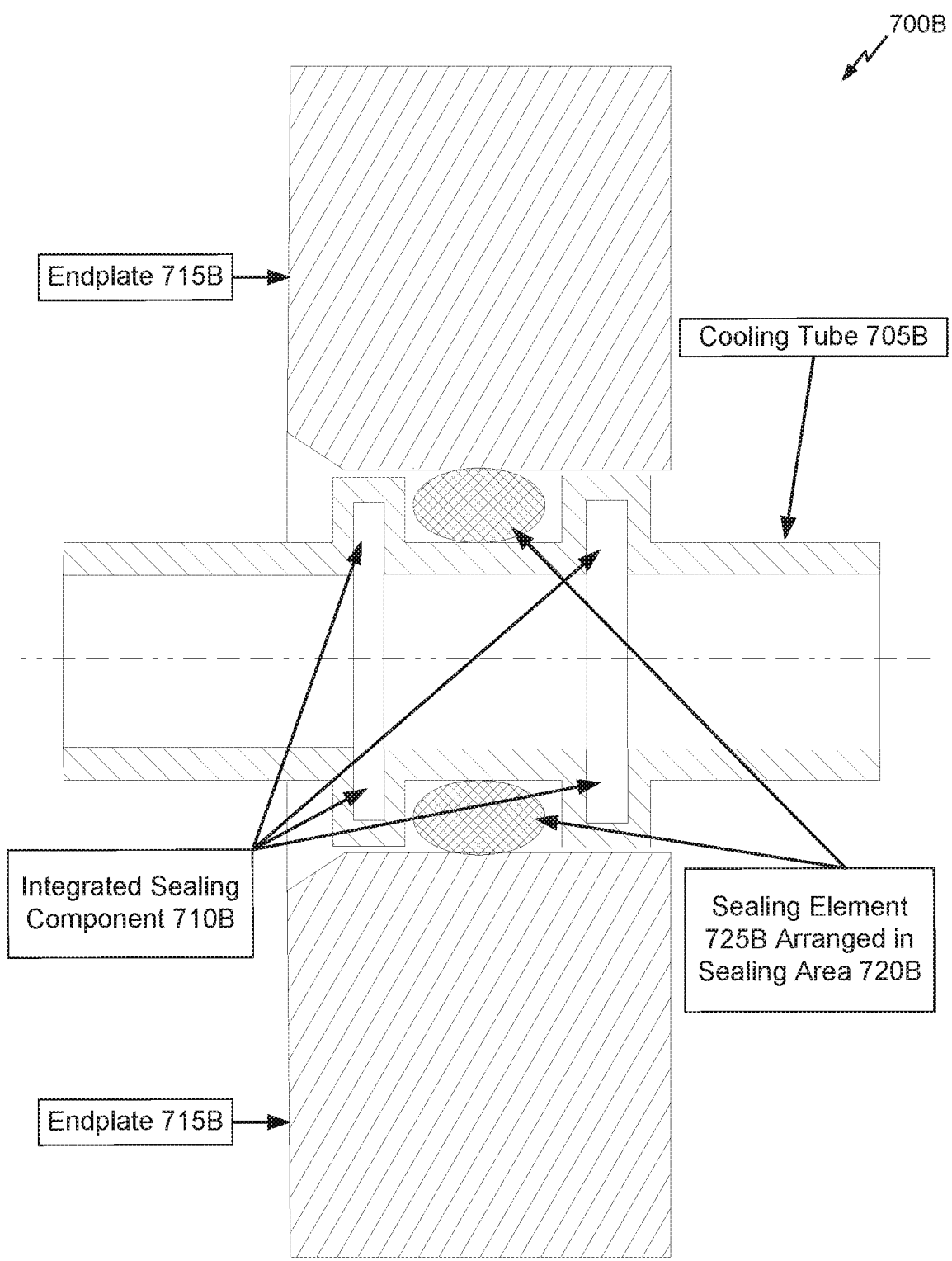
FIG. 7B illustrates an endplate arrangement in accordance with another embodiment of the disclosure.

FIG. 7B illustrates an endplate arrangement 700B in accordance with another embodiment of the disclosure. In an example, the endplate arrangement 700B may correspond to a side perspective of a portion of the insertion-side cover 110 of FIG. 1 which depicts the area surrounding either of cooling connections 120.

Referring to FIG. 7B, cooling tube 705B includes an integrated sealing component 710B. In an example, the cooling tube may be configured as an upset pipe with a threaded portion (e.g., rings or ridges arranged along an external surface of a section of the cooling tube 705B). Once the cooling tube 705A is passed through a hole in endplate 715B, the integrated sealing component 710B is aligned with the hole so as to define a sealing area 720B. For example, the threaded portion may be aligned with the hole in endplate 715B, with a gap between threads of the threaded portion defining the sealing area 720B. The sealing area 720B includes a sealing element 725B. The sealing area 720B is arranged as a ring-shaped gap, and the sealing element 725B is configured as a ring. In an example, the sealing element 725B may be formed from vulcanized rubber.

While not shown in FIG. 7B, another end of the cooling tube 705B may be threaded through another sealing component on the endplate 715B. So, the cooling tube section depicted in FIG. 7B may correspond to either a cooling tube inlet or a cooling tube outlet of the cooling tube 705B. While not shown expressly in FIG. 7B, a cooling tube fitting may be attached to the cooling tube 705B for coupling to a corresponding cooling interface of the cooling manifold, as shown with respect to FIG. 7A.

In the embodiment of FIG. 7B, because a sealing component separate from the cooling tube 705B is not used as in FIG. 7A, a single sealing element is sufficient to ensure to seal the hole in the endplate 715B. As noted above, the endplate arrangement 700B may be configured for either a cooling tube inlet or a cooling tube outlet of the cooling tube 705B. A similar endplate arrangement may be deployed for the other side of the cooling tube 705B, such that both cooling tube inlet and the cooling tube outlet are sealed.

FIGS. 8A-8D a battery module configuration in accordance with an embodiment of the disclosure. In an embodiment, the battery module configuration depicted in FIGS. 8A-8B may be used with respect to battery module 100 in FIGS. 1-2B. Further, FIGS. 8A-8D depict a virtual 'construction' of a battery module that by starting with an empty shell of a battery module and then adding the various components that comprise the battery module.

Figure 8A:
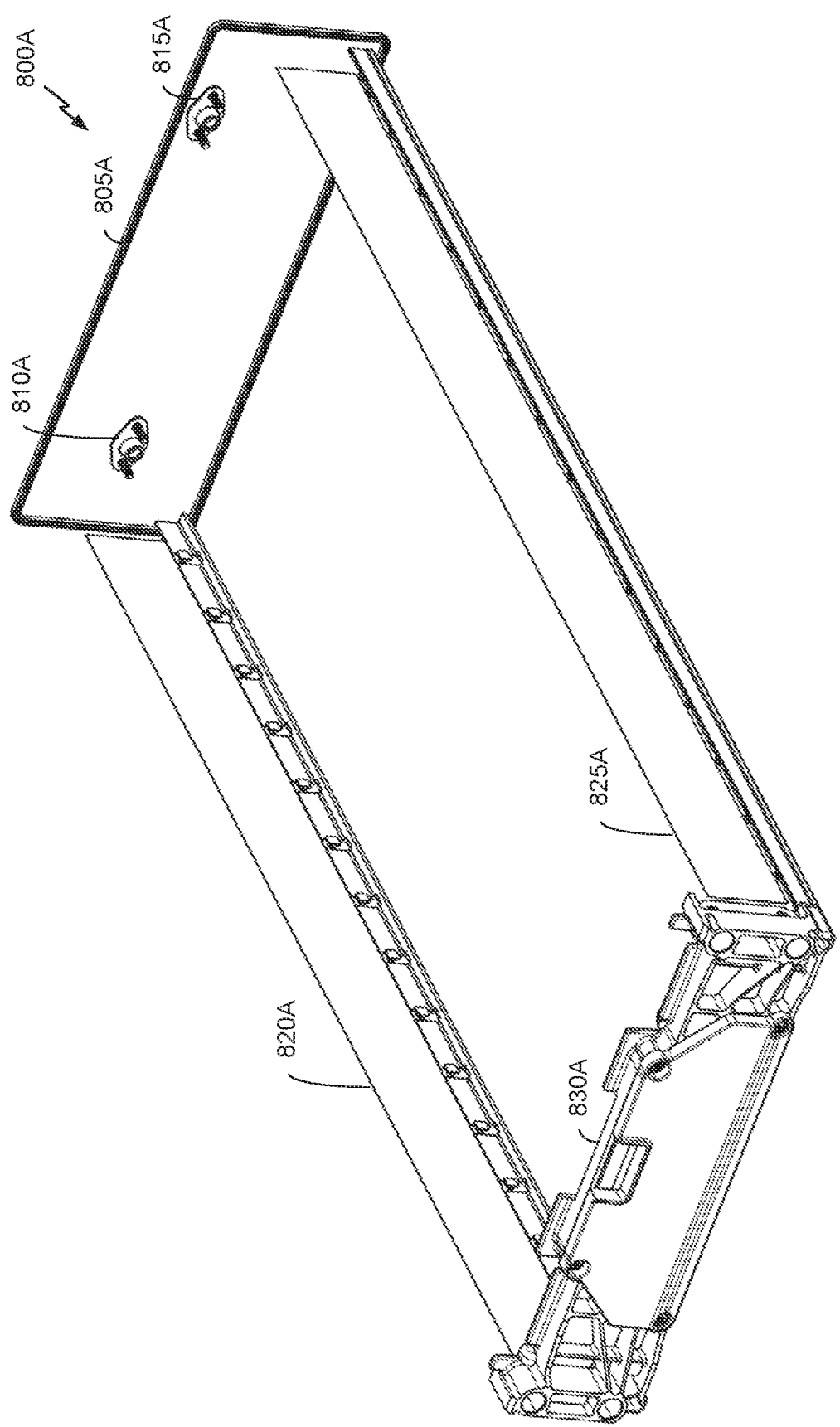
FIGS. 8A-8D a battery module configuration in accordance with an embodiment of the disclosure.

FIG. 8A illustrates a battery module perspective 800A in accordance with an embodiment of the disclosure. In FIG. 8A, the battery module perspective 800A depicts part of an exterior frame of the battery module with an open top (e.g., through which the various components of the battery module may be installed during assembly). In particular, the battery module perspective 800A depicts an insertion-side cover 805A (e.g., similar to insertion-side cover 110 of FIGS. 1-2B) including cooling tube sealing components 810A-

815A (e.g., similar to sealing component 710A of FIG. 7A). Also depicted are sidewalls 820A-825A, and a backwall 830A. While not shown expressly in the battery module perspective 800A of FIG. 8A, the backwall 830A includes fixation recesses 200, the HC connectors 205, and the LC data port 210A/210B depicted in FIGS. 2A-2B.

Figure 8B:
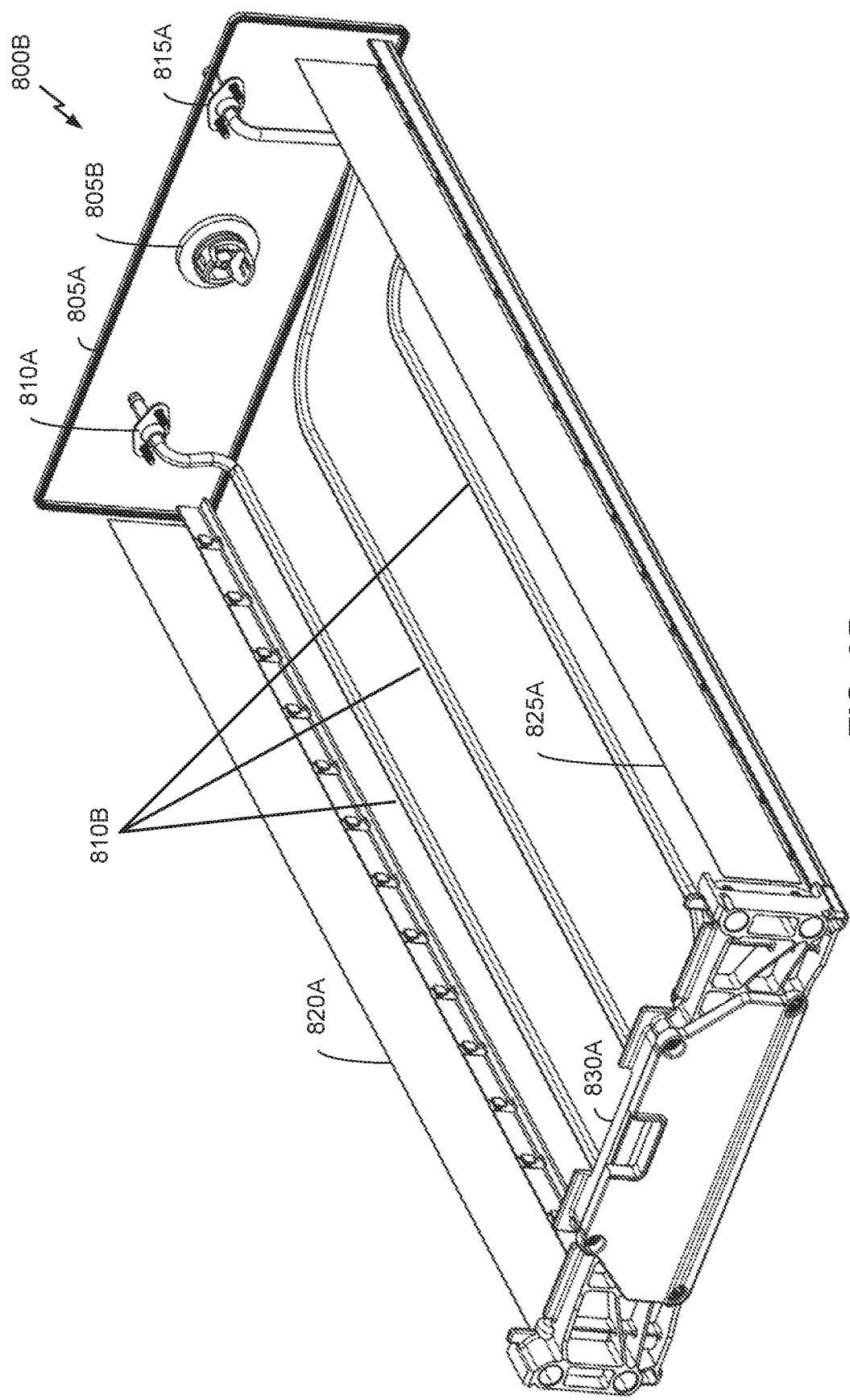

FIG. 8B illustrates a battery module perspective 800B in accordance with an embodiment of the disclosure. In FIG. 8B, an overpressure valve 805B (e.g., correspond to overpressure valve 125 in FIG. 1) is added to the insertion-side cover 805A (e.g., corresponding to fixation points 115 in FIG. 1). The optional flanges and various fixation points of the insertion-side cover 805A are omitted for convenience of illustration. Further added in FIG. 8B is cooling tube 810B, which is connected to the cooling connectors 810A-815A and runs along the bottom of the battery module. In particular, the cooling tube 810B is coupled to a cooling plate (not shown in the battery module perspective 800B of FIG. 8B) for cooling the battery module.

Figure 8C:
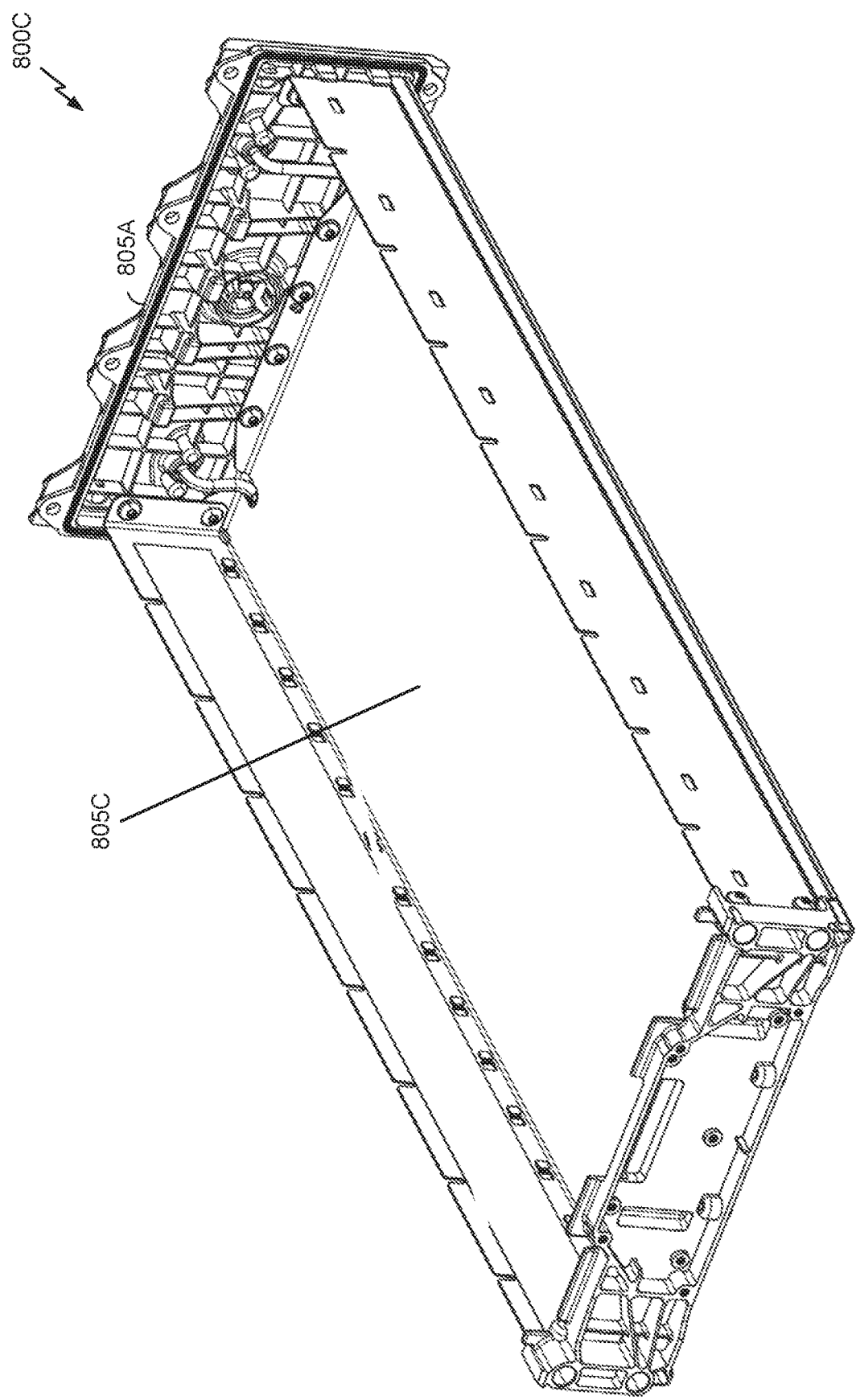

FIG. 8C illustrates a battery module perspective 800C in accordance with an embodiment of the disclosure. In FIG. 8C, a cooling plate 805C is added to the battery module perspective 800B depicted in FIG. 8B, which covers the cooling tube 810B depicted in FIG. 8B. Insertion-side cover 805A is also depicted with additional detail in FIG. 8C.

Figure 8D:
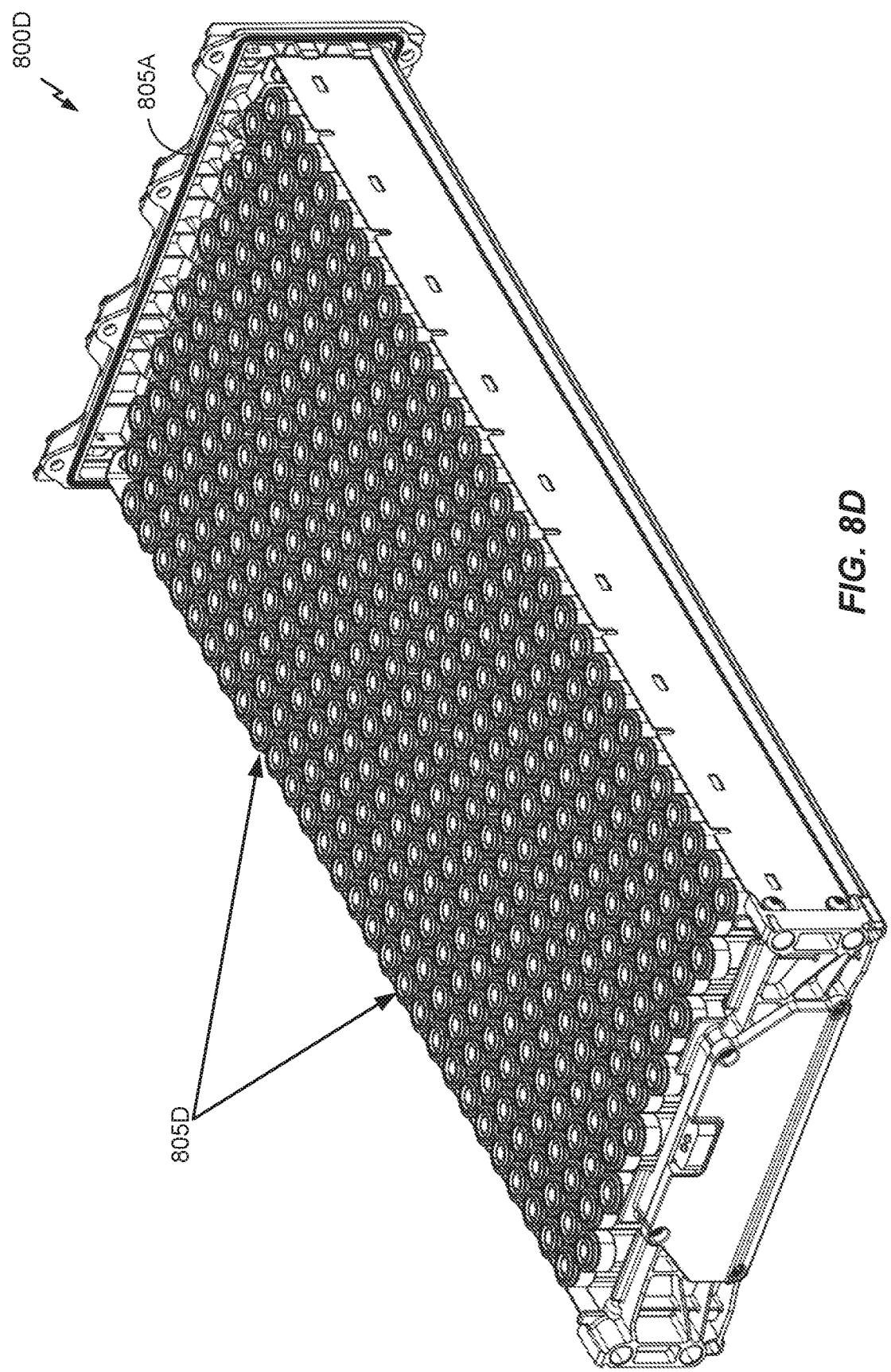

FIG. 8D illustrates a battery module perspective 800D in accordance with an embodiment of the disclosure. In FIG. 8D, cylindrical battery cells 805D are inserted on top of the cooling plate 805C of FIG. 8C (e.g., along with one or more intervening insulation layers for electrical insulation between the cooling plate 805C and the cylindrical battery cells, as will be discussed below in more detail). Also depicted in FIG. 8D are the flanges and fixation points 805D on the insertion-side cover 805A, so the relevant height of the battery cells and insertion-side cover can be appreciated. Once again, various features (e.g., individual bolts, screws, etc.), such as the flanges and fixation points of the insertion-side cover 805A in the preceding FIGS., have been omitted to increase the overall clarity of this sequence of FIGS. by focusing on the more relevant features. Also, in other embodiments, different battery cell types can be used, such as prismatic cells or pouch cells.

Figure 9:
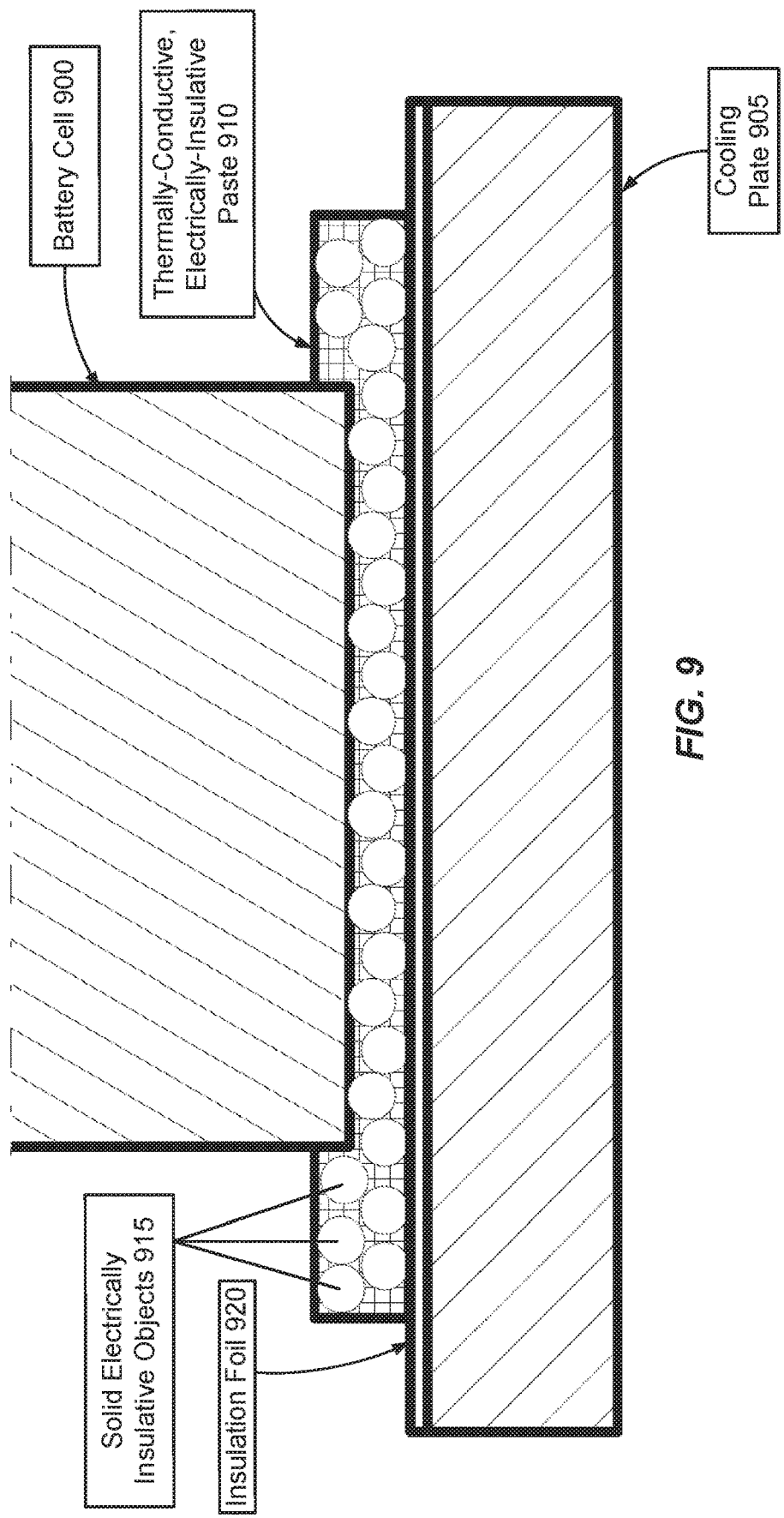
FIG. 9 illustrates a side-perspective of an interface between a battery cell and a cooling plate in accordance with an embodiment of the disclosure.

FIG. 9 illustrates a side-perspective of an interface between a battery cell (e.g., one of the cylindrical battery cells 805D depicted in FIG. 8D) and a cooling plate 905 (e.g., cooling plate 805C depicted in FIG. 8C) in accordance with an embodiment of the disclosure.

Referring to FIG. 9, the cooling plate 905 is arranged underneath the battery cell 900, as well as other battery cells (not shown). The cooling plate 905 is configured to cool the battery cell 900 (e.g., based on a coupling to a cooling tube, such as the cooling tube 810B from FIG. 8B). A first electrical insulation layer is arranged between a bottom of the battery cell 900 and the cooling plate 905. The first electrical insulation layer includes a mixture of thermally-conductive, electrically insulative paste 910 and a set of solid electrically insulative objects 915. For example, the set of solid electrically insulative objects are made of glass (e.g., glass spheres or balls). A second electrical insulation layer including insulation foil 920 is arranged between the first electrical insulation layer and the cooling plate 905.

Referring to FIG. 9, the electrical insulation layer(s) arranged between a bottom of the battery cell 900 and the cooling plate 905 may be configured with an overall thickness that is configured to be greater than or equal to a threshold electrical creeping distance (e.g., to ensure that there is no electrical connection between the battery cell 900 and the cooling plate 905). To this end, the set of solid electrically insulative objects 915 may be configured with sufficient structural strength to resist deformation from the weight of the battery cell 900 (as well as the other battery cells in the battery module). To put another way, the set of solid electrically insulative objects 915 are structurally sufficient to maintain the threshold electrical creeping distance despite a weight of the battery cell(s) (e.g., the battery cell(s) cannot simply compress the set of solid electrically insulative objects 915 based on the cell weight). As noted above, glass may be sufficient for this purpose. While FIG. 9 is described with respect to a single battery cell, the electrical insulation layer(s) may be arranged between the cooling plate 905 and a plurality of cells, such as all the cylindrical battery cells 805D depicted in FIG. 8D.

Figure 10A:
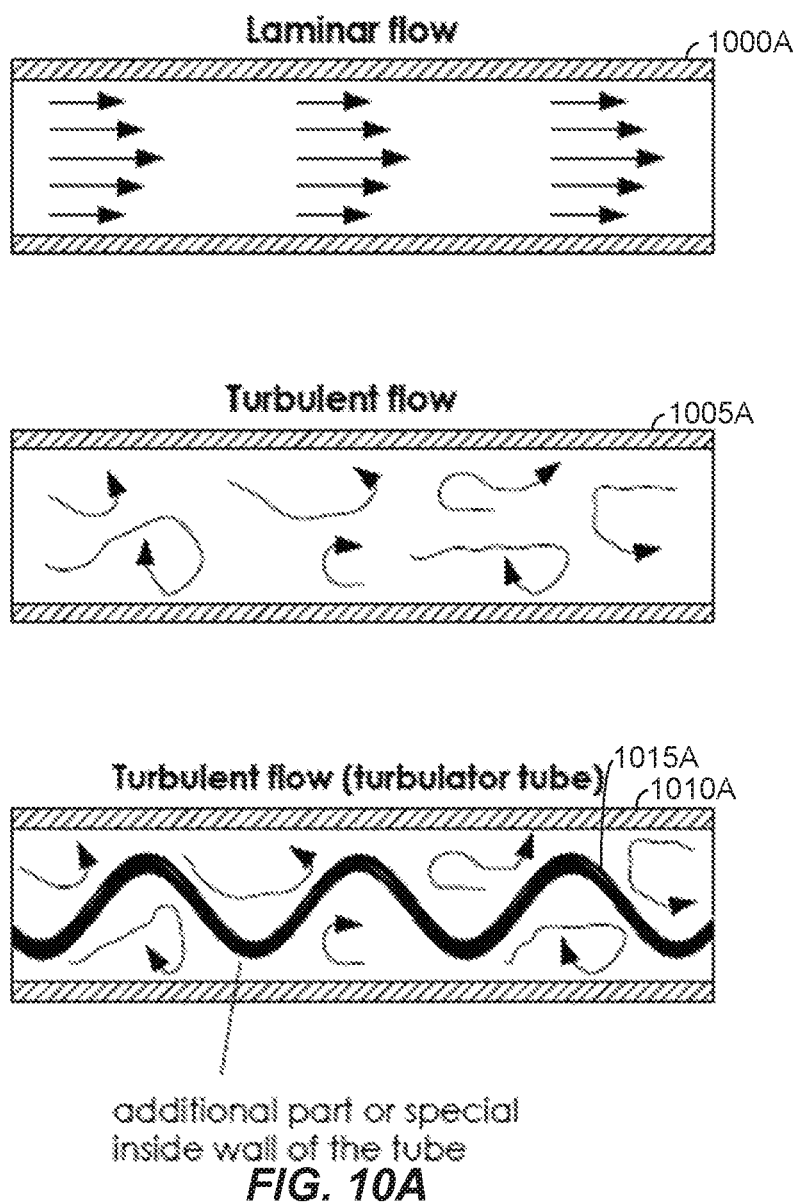
FIG. 10A depicts different liquid flow types that may occur inside of cooling tubes in accordance with an embodiment of the disclosure.

FIG. 10A depicts different liquid flow types that may occur inside of cooling tubes in accordance with an embodiment of the disclosure. In FIG. 10A, arrows depict fluid movement inside of a respective cooling tube.

At 1000A, a cooling tube with a laminar flow is depicted. Generally, a laminar flow as shown at 1000A is associated with lower pressure loss and thereby lower pump energy to move liquid coolant through the cooling tube. However, a laminar flow as shown at 1000A is also associated with lower cooling performance.

At 1005A, a cooling tube with a turbulent flow is depicted. The turbulent flow at 1005A may be achieved by increasing the pressure inside the cooling tube, such as by decreasing the diameter of the cooling tube or roughening an interior surface of the cooling tube. Generally, a turbulent flow as shown at 1005A is associated with higher cooling performance compared with a laminar flow. However, a turbulent flow as shown at 1005A is also associated with higher pressure loss and thereby higher pump energy to move liquid coolant through the cooling tube compared with a laminar flow.

At 1010A, another cooling tube with a turbulent flow is depicted. The turbulent flow at 1010A may be achieved via an integrated turbulator component 1015A inside the cooling tube, such as a spring (e.g., a coiled spring, a wave spring, etc.) or a chain.

FIG. 10B illustrates turbulent flows for cooling tubes with different integrated turbulator component types in accordance with an embodiment of the disclosure.

At 1000B, a cooling tube including a spring having coils or waves with different diameters is depicted. As shown, the different diameters of the coils or waves repeat in accordance with an alternating sequence. At 1005B, a cooling tube including a wave spring is depicted. At 1010B, a cooling tube including a spring with includes adjacent coils or waves that are staggered apart from each other by different gradients. So, the gap or interval between successive coils or waves in the spring need not be constant.

Figure 11A:
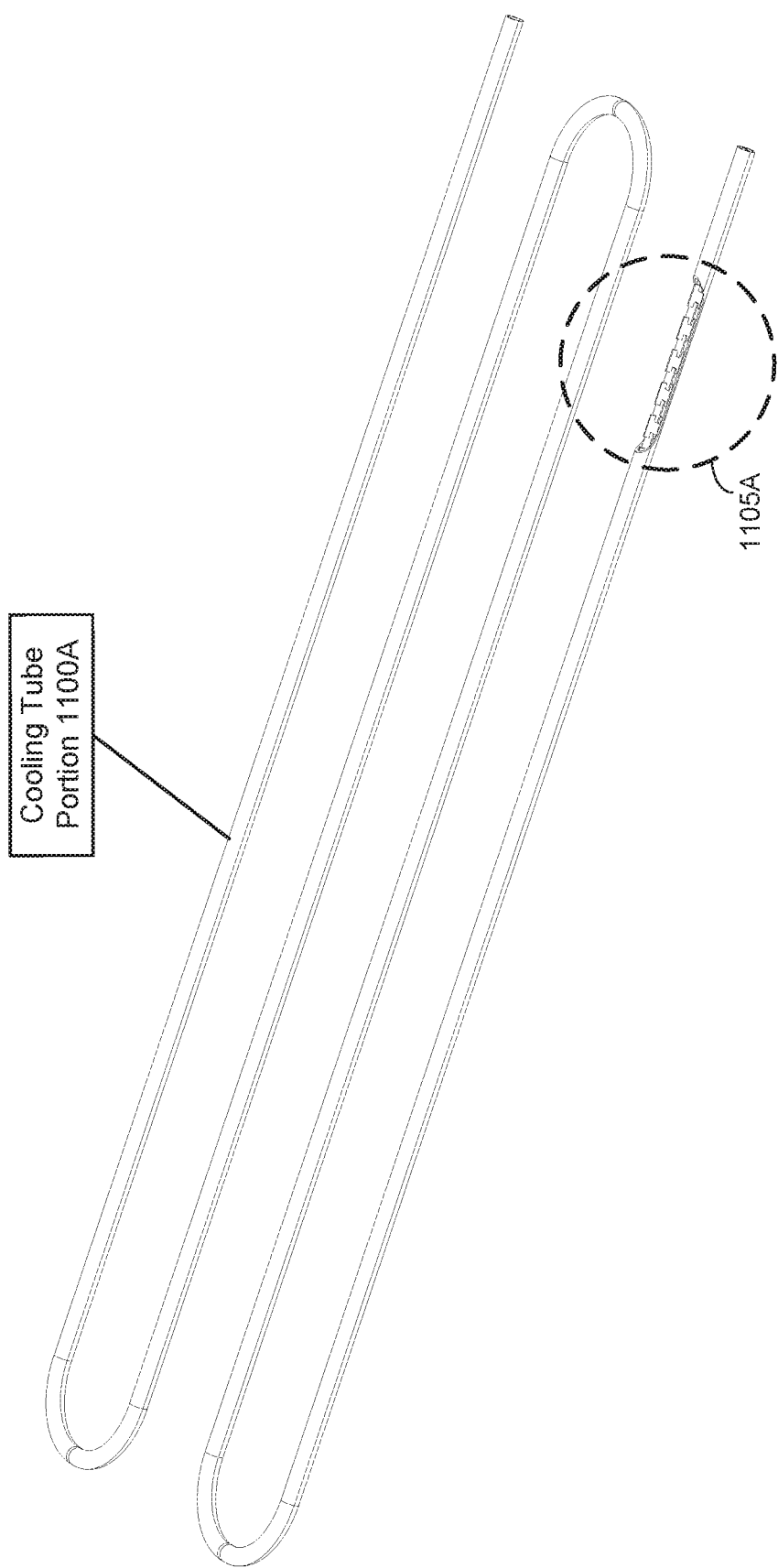
FIG. 11A illustrates a cooling tube portion in accordance with an embodiment of the disclosure.

FIG. 11A illustrates a cooling tube portion 1100A in accordance with an embodiment of the disclosure. The cooling tube portion 1100A corresponds to a section of a cooling tube that is arranged beneath a set of battery cells, such as the cooling tube 810B in FIG. 8B. Sections of the cooling tube 810B that run up the insertion-side cover 805A through respective holes is not shown in FIG. 11A.

Referring to FIG. 11A, some or all of the cooling tube portion 1100A is configured to include an integrated turbulator component, as shown at exposed section 1105A. So, the integrated turbulator component can be omitted in areas where cooling is not actually needed (e.g., in the cooling manifold, etc.) such that a laminar flow is obtained for liquid coolant transported therein. Then, the integrated turbulator component arranged specifically in the cooling tube portion 1100A that is underneath the set of battery cells which require cooling to transition a flow of the liquid coolant from a laminar flow to a turbulent flow. The integrated turbulator component can correspond to any of the integrated turbulator component types described above with respect to FIGS. 10A-10B.

As shown in FIG. 11A, the cooling tube portion 1100A is shaped or bent at multiple points to conform to an arrangement of the set of battery cells above the cooling tube portion 1100 in the battery module (e.g., to provide cooling to each battery cell among the set of battery cells). The integrated turbulator component may be included in each bent section of the cooling tube portion 1100A (as well as the straight parallel sections of tube) to obtain a turbulent flows in these areas where high cooling performance is desired.

Figure 11B:
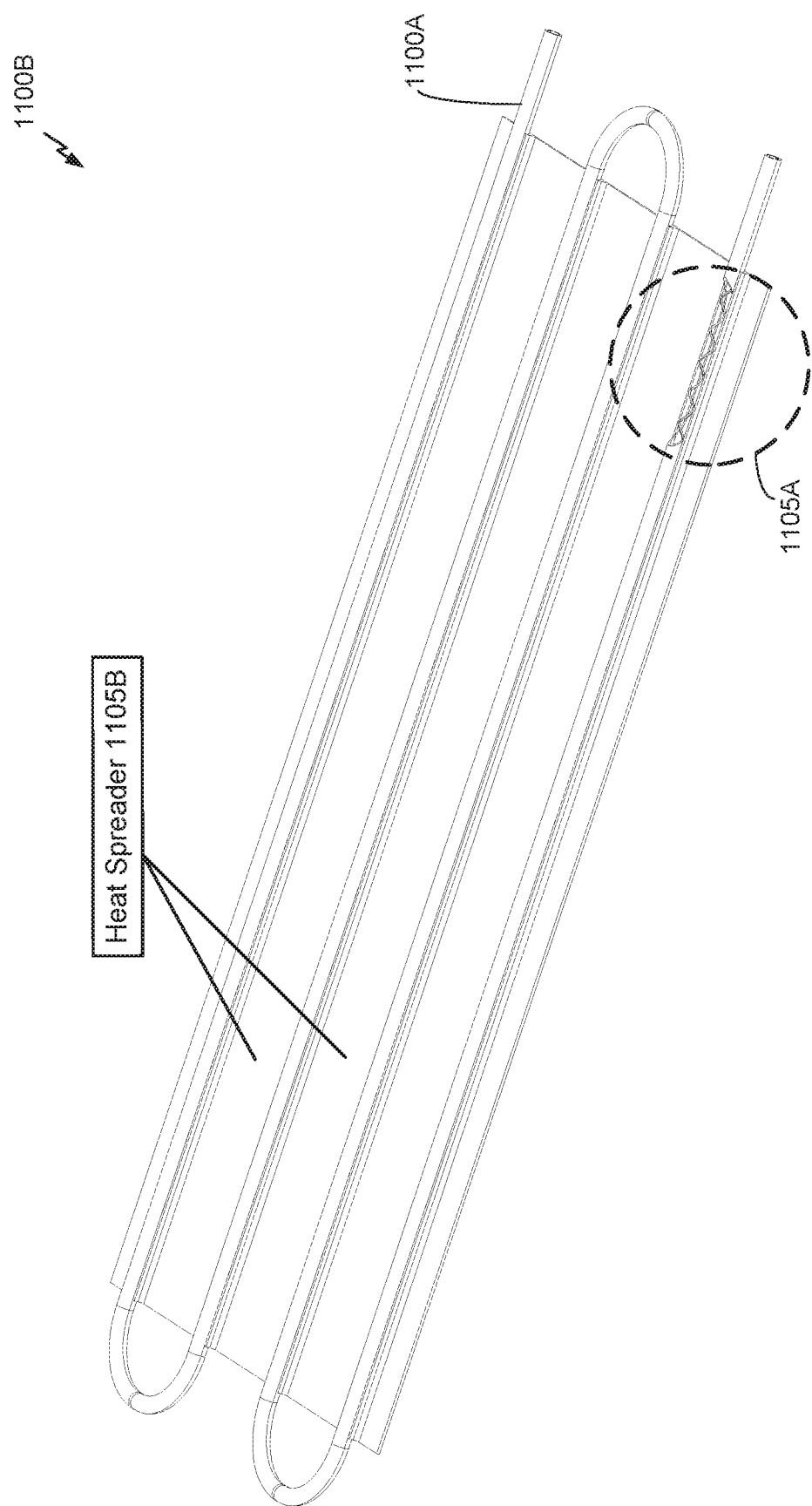
FIG. 11B illustrates a cooling tube arrangement in accordance with an embodiment of the disclosure.

FIG. 11B illustrates a cooling tube arrangement 1100B in accordance with an embodiment of the disclosure. The cooling tube arrangement 1100A includes a heat spreader 1105B arranged underneath the cooling tube portion 1100A.

FIG. 11C illustrates the exposed section 1105A from FIG. 11A including an integrated turbulator component 1100C in accordance with an embodiment of the disclosure. In FIG. 11C, the integrated turbulator component 1100C is a chain.

Figure 11D:
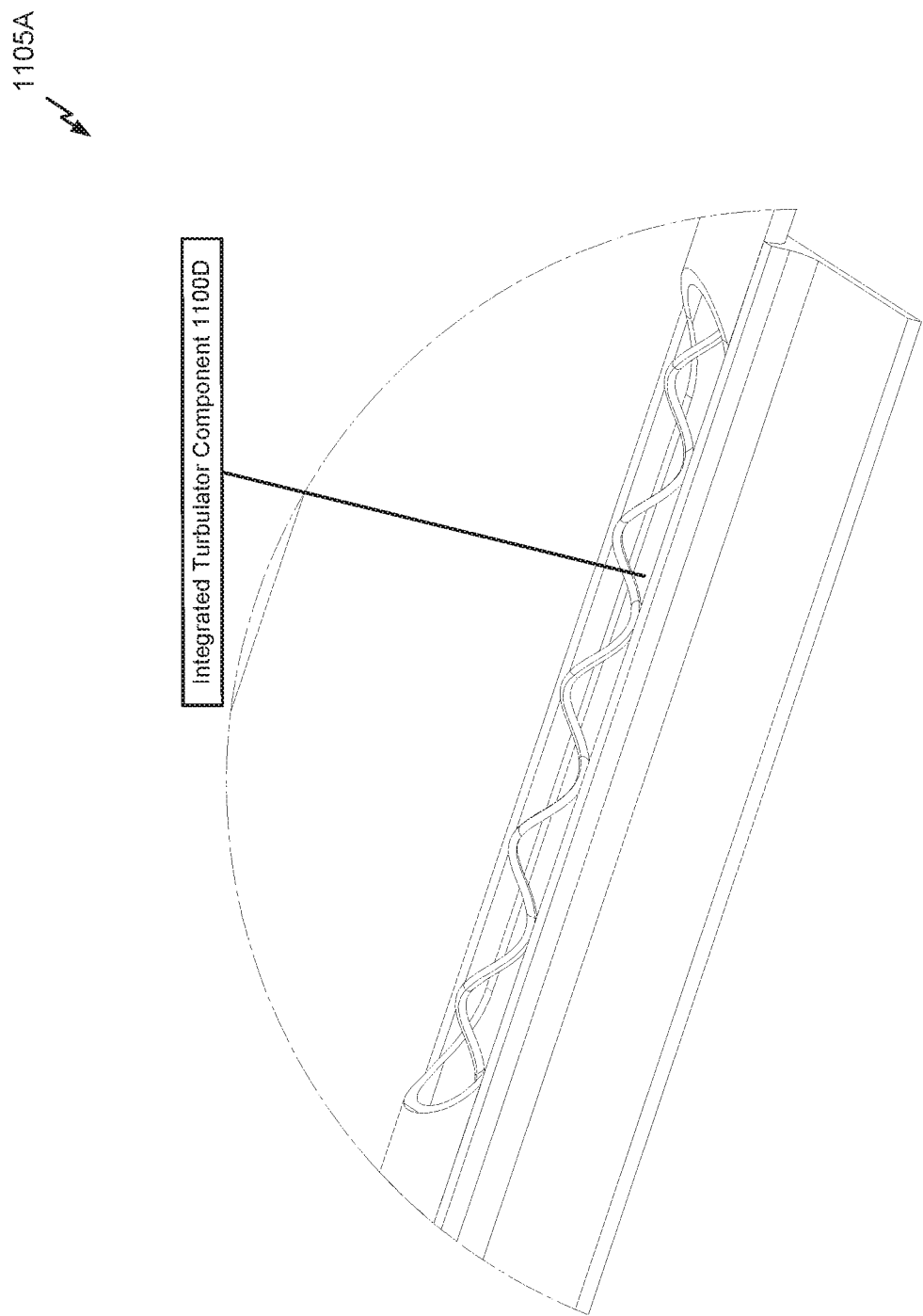
FIG. 11D illustrates the exposed section from the cooling tube portion of FIG. 11A including an integrated turbulator component in accordance with another embodiment of the disclosure.

FIG. 11D illustrates the exposed section 1105A from FIG. 11A including an integrated turbulator component 1100D in accordance with another embodiment of the disclosure. In FIG. 11D, the integrated turbulator component 1100C is a spring.

Figure 12:
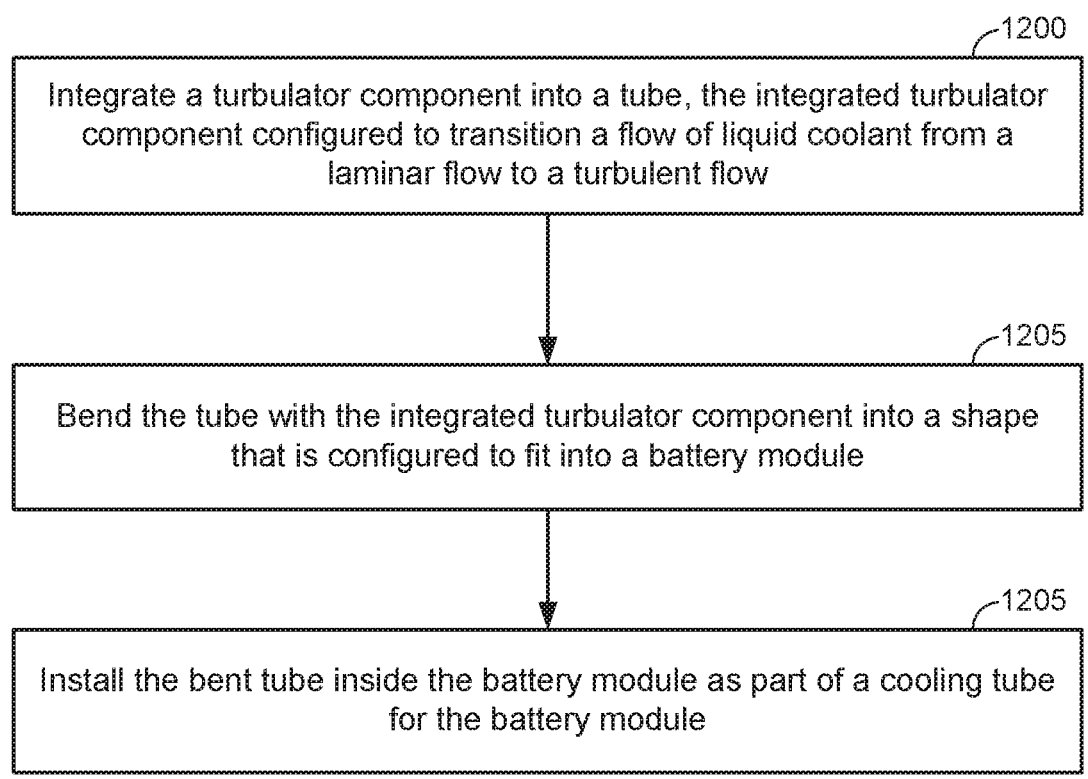
FIG. 12 illustrates a process of generating a cooling tube for a battery module in accordance with an embodiment of the disclosure.

FIG. 12 illustrates a process of generating a cooling tube for a battery module in accordance with an embodiment of the disclosure. The process of FIG. 12 may be used to generate the cooling tube section 1100A in an example.

Referring to FIG. 12, at block 1200, a turbulator component is integrated (e.g., inserted) into a tube. In an example, the tube may begin as straight at block 1200, which simplifies the insertion of the turbulator component into the tube. The integrated turbulator component is configured to transition a flow of liquid coolant entering into the tube from a laminar flow to a turbulent flow as described above. At block 1205, the tube with the integrated turbulator component is bent into a shape that is configured to fit into the battery module (e.g., the shape described above with respect to the cooling tube section 1100A). At block 1210, the bent tube is installed inside the battery module as part of a cooling tube for the battery module. In an embodiment, the bent tube is used as the cooling tube portion 1100A. As described above, the integrated turbulator component may be configured as a spring (e.g., a coiled spring, a wave spring, a spring with different diameters or gradients, etc.) or a chain.

While the embodiments described above relate primarily to land-based electric vehicles (e.g., cars, trucks, etc.), it will be appreciated that other embodiments can deploy the various battery-related embodiments with respect to any type of electric vehicle (e.g., boats, submarines, airplanes, helicopters, drones, spaceships, space shuttles, rockets, etc.).

While the embodiments described above relate primarily to battery module compartments and associated battery modules and insertion-side covers for deployment as part of an energy storage system for an electric vehicle, it will be appreciated that other embodiments can deploy the various battery-related embodiments with respect to any type of energy storage system. For example, besides electric vehicles, the above-noted embodiments can be applied to energy storage systems such as home energy storage systems (e.g., providing power storage for a home power system), industrial or commercial energy storage systems (e.g., providing power storage for a commercial or industrial power system), a grid energy storage system (e.g., providing power storage for a public power system, or power grid) and so on.

As will be appreciated, the placement of the various battery module compartments in the above-noted embodiments is described as being integrated into a vehicle floor of an electric vehicle. However, it will be appreciated that the general closed compartment profile design may be extended to battery module mounting areas that can be installed in other locations within the electric vehicle (e.g., in a trunk of the electric vehicle, behind one or more car seats, under a front-hood of the electric vehicle, etc.).

The forgoing description is provided to enable any person skilled in the art to make or use embodiments of the invention. It will be appreciated, however, that the invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the embodiments of the disclosure.

The invention claimed is:

1. An endplate arrangement for a battery module configured for insertion into a battery module compartment of an energy storage system, comprising:
   an endplate configured to secure the battery module inside the energy storage system;
   a cooling tube including a cooling tube inlet and a cooling tube outlet that extend outside the battery module via first and second holes, respectively, in the endplate, the cooling tube configured to receive liquid coolant via a first cooling interface of a cooling manifold coupled to the cooling tube inlet and to output the liquid coolant via a second cooling interface of the cooling manifold coupled to the cooling tube outlet;
   a first sealing component arranged inside a given hole among the first and second holes, the first sealing component defining a first sealing area between the first sealing component and the cooling tube in the given hole and a second sealing area between the first sealing component and the endplate in the given hole;
   a first sealing element arranged in the first sealing area; and
   a second sealing element arranged in the second sealing area.

2. The endplate arrangement of claim 1,
   wherein the given hole corresponds to the first hole, or
   wherein the given hole corresponds to the second hole.

3. The endplate arrangement of claim 1,
   wherein the first and/or second sealing elements include vulcanized rubber.

4. The endplate arrangement of claim 1, wherein the first and second sealing areas are arranged as ring-shaped gaps around the cooling tube and the first sealing component, respectively, inside the given hole.

5. The endplate arrangement of claim 1,
   wherein the given hole corresponds to the first hole, further comprising:
   a second sealing component arranged inside the second hole, the second sealing component including a third sealing area between the second sealing component and the cooling tube in the second hole and a fourth sealing area between the second sealing component and the endplate in the second hole.

6. An endplate arrangement for a battery module configured for insertion into a battery module compartment of an energy storage system, comprising:

an endplate configured to secure the battery module inside the energy storage system;

a cooling tube including a cooling tube inlet and a cooling tube outlet that extend outside the battery module via first and second holes, respectively, in the endplate, the cooling tube configured to receive liquid coolant via a first cooling interface of a cooling manifold coupled to the cooling tube inlet and to output the liquid coolant via a second cooling interface of the cooling manifold coupled to the cooling tube outlet, wherein the cooling tube includes an integrated sealing component arranged inside of a given hole among the first and second holes, the integrated sealing component defining a sealing area between the cooling tube and the endplate in the given hole; and a sealing element arranged in the sealing area.

7. The endplate arrangement of claim 6, wherein the cooling tube is configured as an upset pipe with a threaded portion that corresponds to the integrated sealing component, and wherein the sealing area corresponds to a gap between threads of the threaded portion inside of the given hole.

8. The endplate arrangement of claim 6, wherein the given hole corresponds to the first hole, or wherein the given hole corresponds to the second hole.

9. The endplate arrangement of claim 6, wherein the sealing element includes vulcanized rubber.

10. The endplate arrangement of claim 6, wherein the sealing area is arranged as a ring-shaped gap around the cooling tube inside the given hole.

11. The endplate arrangement of claim 6, wherein the given hole corresponds to the first hole, and wherein the cooling tube includes another integrated sealing component arranged inside the second hole, the another integrated sealing component defining another sealing area between the cooling tube and the endplate in the second hole.

* * * * *